US007010317B2

(12) United States Patent
Hwang et al.

(10) Patent No.: US 7,010,317 B2
(45) Date of Patent: Mar. 7, 2006

(54) APPARATUS AND METHOD FOR TRANSMITTING TFCI USED FOR DSCH IN A W-CDMA MOBILE COMMUNICATION SYSTEM

(75) Inventors: Sung-Oh Hwang, Kyonggi-do (KR); Kook-Heui Lee, Songnam-shi (KR); Hyun-Woo Lee, Suwon-shi (KR); Sung-Ho Choi, Songnam-shi (KR); Byung-Jae Kwak, Songnam-shi (KR); Yang-Hee Suh, Seoul (KR)

(73) Assignee: Samsung Electronics Co., Ltd., (KR)

( * ) Notice: Subject to any disclaimer, the term of this patent is extended or adjusted under 35 U.S.C. 154(b) by 666 days.

(21) Appl. No.: 10/039,332

(22) Filed: Nov. 7, 2001

(65) Prior Publication Data

US 2002/0115464 A1   Aug. 22, 2002

(30) Foreign Application Priority Data

Nov. 7, 2000   (KR) .............................. 2000-65966
Nov. 18, 2000  (KR) .............................. 2000-68796

(51) Int. Cl.
   *H04Q 7/20* (2006.01)
(52) U.S. Cl. .................. 455/522; 455/69; 455/442
(58) Field of Classification Search ............... 455/522, 455/69, 439, 67.1, 442, 525, 436; 370/252, 370/318, 337
See application file for complete search history.

(56) References Cited

U.S. PATENT DOCUMENTS 5,963,870 A *  10/1999  Chheda et al. .............. 455/522
6,374,085 B1 *  4/2002   Saints et al. ................. 455/69
6,650,905 B1 * 11/2003   Toskala et al. .............. 455/522
6,904,290 B1 *  6/2005   Palenius ..................... 455/522

FOREIGN PATENT DOCUMENTS

EP     1 207 711     5/2002

OTHER PUBLICATIONS

European Search Report dated Nov. 13, 2003 issued in a counterpart application, namely, Appln. No. 01126603.8.
"DSCH split type support", 3GPP TSG RAN WG1#15, Oct. 16, 2000, pp. 1-15.
"RRC Protocol Specification", 3GPP TS 25.331 Version 3.4.1 Release 1999, Sep. 2000, pp. 140, 327, and 342.
LG Electronics: "Power Control of TFCI Field for DSCH in Soft Handover", Nov. 21-24, 2000, pp. 1-2.
LG Electronics: "TFCI Power Control in Spilt Mode", Jan. 15-18, 2001, pp. 1-2.
LG Electronics: "CR for TR 25.841: DSC Power Control Improvement in Soft Handover", Feb. 27, 2001.
Samsung Electronics and LG Electronics: "Proposed WI Enhancement on the DSCH Hard Split Mode", Mar. 13-16, 2001.

* cited by examiner

*Primary Examiner*—Tilahun Gesesse
(74) *Attorney, Agent, or Firm*—Dilworth & Barrese LLP

(57) ABSTRACT

Disclosed is a method for determining transmission power of a second TFCI bit indicating transport format information of data on a downlink shared channel transmitted from a selected Node B to a UE in a mobile communication system including the UE existing in a handover zone and a plurality of Node Bs in an active set of the UE. The Node Bs transmit dedicated channel data including a first TFCI bit to the UE over dedicated channels. A first Node B transmits dedicated channel data over a dedicated channel and transmits downlink shared channel data over the downlink shared channel. The first Node B determines a transmission power level of the second TFCI bit to be higher than a ratio of transmission power of the dedicated channel data from a Node B transmitting only the dedicated channel data to transmission power of the first TFCI bit.

38 Claims, 27 Drawing Sheets

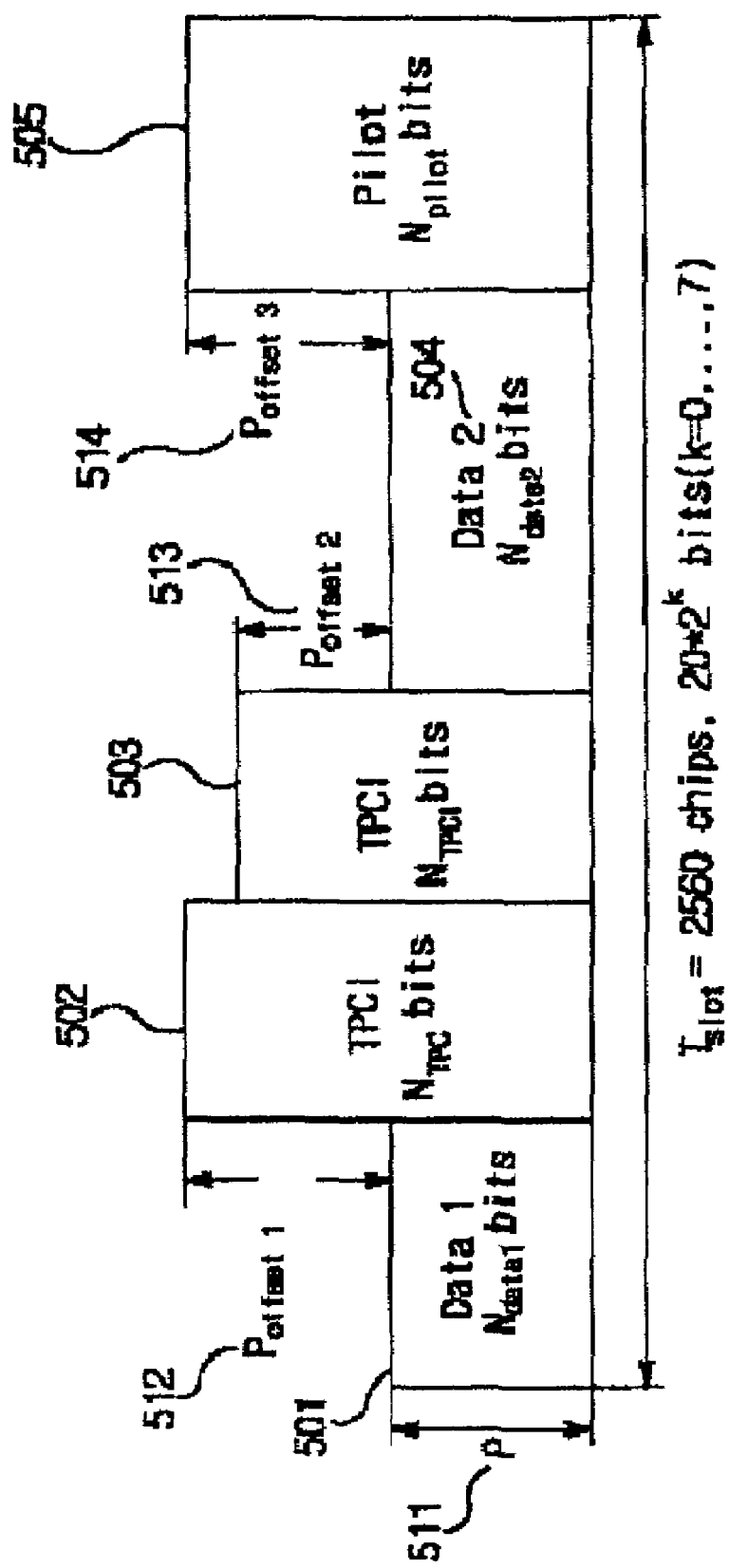

9.1.36 RADIO LINK SETUP REQUEST
9.1.36 1 FDD message

| IE/Group Name | Presence | Range | IE type and reference | Semantics description | Criticality | Assigned criticality |
|---|---|---|---|---|---|---|
| Message Discriminator | M | | 9.2.1.45 | | — | |
| Message Type | M | | 9.2.1.46 | | YES | reject |
| CRNC Communication context ID | M | | 9.2.1.18 | | YES | reject |
| Transaction ID | M | | 9.2.1.62 | | — | |
| UL DPCH Information | | | | | YES | reject |
| >UL Scrambling code | M | | 9.2.2.59 | | — | |
| >Min UL Channellsation Code Length | M | | 9.2.2.22 | | — | |
| >Max Number of UL DPCHs | C - CodeLen | | 9.2.2.21 | | — | |
| >puncture limit | M | | 9.2.1.50 | For UL | — | |
| >TFCS | M | | 9.2.1.58 | For UL | — | |
| >UL DPCH Solt Format | M | | 9.2.2.57 | | — | |
| >UL SIR Target | M | | UL SIR 9.2.2.58 | | — | |
| >Diversity mode | M | | 9.2.2.9 | | — | |
| >SSDT cell ID Length | O | | 9.2.2.45 | | — | |
| >S Field Length | C-FBI | | 9.2.2.40 | | — | |
| DL DPCH Information | | | | | YES | reject |
| >TFCS | M | | 9.2.1.58 | For DL | — | |
| >DL DPCH Slot Format | M | | 9.2.2.10 | | — | |
| >TFCI signalling mode | M | | 9.2.2.50 | | — | |
| >TFCI presence | C - SlotFormat | | 9.2.1.57 | | — | |
| >Multiplexing Position | M | | 9.2.2.29 | | — | |
| >PDSCH RL ID | C-DSCH | | RL ID 9.2.1.53 | | — | |
| >PDSCH code mapping | C-DSCH | | 9.2.2.25 | | — | |
| >Power Offset Information | | 1 | | | — | |
| >>PO1 | M | | Power Offset 9.2.2.29 | Power offset for the TFCI bits | — | |
| >>PO2 | M | | Power Offset 9.2.2.29 | Power offset for the TPC bits | — | |
| >>PO3 | M | | Power Offset 9.2.2.29 | Power offset for the pilot bits | — | |
| >FDD TPC DL Step Size | M | | 9.2.2.16 | | — | |
| The Rest Omitted | | | | | | |

FIG. 25

9.1.36 RADIO LINK SETUP REQUEST
9.1.36.1 FDD message

| IE/Group Name | Presence | Range | IE type and reference | Semantics description | Criticality | Assigned Criticality |
|---|---|---|---|---|---|---|
| Message Discriminator | M | | 9.2.1.45 | | — | |
| Message Type | M | | 9.2.1.46 | | YES | reject |
| CRNC Communication context ID | M | | 9.2.1.18 | | YES | reject |
| Transaction ID | M | | 9.2.1.62 | | — | |
| UL DPCH Information | | 1 | | | YES | reject |
| >UL Scrambling code | M | | 9.2.2.59 | | — | |
| >Min UL Channelisation Code Length | M | | 9.2.2.22 | | — | |
| >Max Number of UL DPCHs | C - CodeLen | | 9.2.2.21 | | — | |
| >puncture limit | M | | 9.2.1.50 | For UL | — | |
| >TFCS | M | | 9.2.1.58 | For UL | — | |
| >UL DPCCH Slot Format | M | | 9.2.2.57 | | — | |
| >UL SIR Target | M | | UL SIR 9.2.2.58 | | — | |
| >Diversity mode | M | | 9.2.2.9 | | — | |
| >SSDT cell ID Length | O | | 9.2.2.45 | | — | |
| >S Field Length | C-FBI | | 9.2.2.40 | | — | |
| DL DPCH Information | | | | | YES | reject |
| >TFCS | M | | 9.2.1.58 | For DL | — | |
| >DL DPCH Slot Format | M | | 9.2.2.10 | | — | |
| >TFCI signalling mode | M | | 9.2.2.50 | | — | |
| >TFCI presence | C - SlotFormat | | 9.2.1.57 | | — | |
| >Multiplexing Position | M | | 9.2.2.29 | | — | |
| >PDSCH RL ID | C-DSCH | | RL ID 9.2.1.53 | | — | |
| >PDSCH code mapping | C-DSCH | | 9.2.2.25 | | — | |
| >Power Offset Information | | 1 | | | — | |
| >>PO1 | M | | Power Offset 9.2.2.29 | Power offset for the TFCI bits | — | |
| >>PO2 | M | | Power Offset 9.2.2.29 | Power offset for the TPC bits | — | |
| >>PO3 | M | | Power Offset 9.2.2.29 | Power offset for the pilot bits | — | |
| >>PO4 | M | | 9.2.2.29 | Power offset for the TFCI bits for DSCH | — | |

The Rest Omitted

FIG. 26

9.1.47 RADIO LINK RECONFIGURATION FRQUEST
9.1.47.1 FDD message

| IE/Group Name | Presence | Range | IE type and Reference | Semantics Description | Criticality | Assigned Criticality |
|---|---|---|---|---|---|---|
| Message Discriminator | M | | 9.2.1.45 | | — | |
| Message Type | M | | 9.2.1.46 | | YES | reject |
| Node B Communication Context ID | M | | 9.2.1.48 | The reserved value "ALL NBCC" sjall not be used. | YES | reject |
| Transaction ID | M | | 9.2.1.62 | | — | |
| UL DPCH Information | | 0..1 | | | YES | reject |
| >TFCS | O | | 9.2.1.58 | For the UL. | — | |
| DL DPCH Information | | 0..1 | | | YES | reject |
| >TFCS | O | | 9.2.1.58 | For the UL. | | |
| >TFCI Signalling Mode | O | | 9.2.2.50 | | — | |
| >Limited Power Increase | O | | | | | |
| >Power Offset Information | | 1 | | | — | |
| >>P01 | M | | Power Offset 9.2.2.29 | Power offset for the TFCI bits | — | |
| >>P04 | M | | Power Offset 9.2.2.29 | Power offset for the TFCI bits for DSCH | — | |

The Rest Omitted

APPARATUS AND METHOD FOR TRANSMITTING TFCI USED FOR DSCH IN A W-CDMA MOBILE COMMUNICATION SYSTEM

PRIORITY

This application claims priority to an application entitled "Apparatus and Method for Transmitting TFCI Used for DSCH in a W-CDMA Mobile Communication System" filed in the Korean Industrial Property Office on Nov. 7, 2000 and assigned Serial No. 2000-65966, and an application entitled "Apparatus and Method for Transmitting TFCI Used for DSCH in a W-CDMA Mobile Communication System" filed in the Korean Industrial Property Office on Nov. 18, 2000 and assigned Serial No. 2000-68796, the contents of both of which are hereby incorporated by reference.

BACKGROUND OF THE INVENTION

1. Field of the Invention

The present invention relates generally to transmission power control on a downlink shared channel (DSCH) used in an asynchronous W-CDMA (Wideband Code Division Multiple Access) mobile communication system, and in particular, to an apparatus and method for controlling transmission power by transmitting a TFCI (Transmit Format Combination Indictor) in a period of a downlink dedicated physical channel (DL-DPCH) assigned to a UE (User Equipment) which uses the DSCH in a handover (or handoff) zone.

2. Description of the Related Art

A downlink shared channel (DSCH) used in a European W-CDMA mobile communication system, a $3^{rd}$ generation mobile communication system, is shared by a plurality of UEs. The DSCH is assigned to the UEs on a time division basis to transmit packet data or other high-speed data to the UEs in a 10 ms-radio frame unit. The DSCH can vary a data rate of transmission data in a frame unit, and can be subject to power control in a slot unit, like a dedicated channel (DCH) established between a Node B and a UE in the W-CDMA system. The radio frame, a basic unit for transmitting signals in the W-CDMA system, has a length of 10 ms, and each radio frame is comprised of 15 slots. In addition, the DSCH is a channel for transmitting user data only. Transmission power of the DSCH is controlled according to a TPC (Transmit Power Control) bit transmitted over an uplink dedicated channel (UL-DCH) assigned to the UE at the same time when the DSCH is assigned to the UE. Further, the TPC is also used for power control on the DL-DCH (Downlink Dedicated Channel) assigned to the UE in association with the DSCH (see 3GPP TS 25.214). The transport channel DL-DCH is transmitted over the physical channel DL-DPCH. The DSCH can be continuously transmitted to one UE over a plurality of frames. Alternatively, the DSCH can be transmitted to the UE over only one frame. The time to transmit the DSCH to a plurality of the UEs is determined by scheduling in an upper layer. The determined time information is provided to the UEs through a signaling message from the upper layer or through a TFCI bit for the DL-DPCH established in association with the DSCH.

FIG. 1A illustrates a structure of the DSCH. Referring to FIG. 1A, reference numeral 101 depicts a 10 ms radio frame of the DSCH, and reference numeral 103 depicts a slot Slot#i in the radio frame 101. As illustrated in FIG. 1A, the DSCH radio frame 101 is comprised of 15 slots Slot#0–Slot#14, and the DSCH slot 103 has a length of 2560 chips. An amount of information transmitted over the DSCH slot 103 is in inverse proportion to a spreading factor (SF) used for the DSCH slots, and the SF has a value of 4 to 256.

FIG. 1B illustrates a structure of the DL-DPCH for transmitting the DL-DCH assigned to the UE by the Node B. The DL-DPCH is assigned to the UE in association with the DSCH of FIG. 1A for power control on the DSCH and signaling even when the DSCH is in use. In FIG. 1B, reference numeral 111 indicates a 10 ms radio frame of the DL-DPCH, and each slot of the DL-DPCH radio frame is comprised of DATA1 113, TPC 112, TFCI 114, DATA2 115, and Pilot 116. Each slot of the DL-DPCH can have various structures according to the lengths of the DATA1, TPC, TFCI, DATA2, and Pilot.

The DATA1 113 and the DATA2 115 constitute a downlink dedicated physical data channel (DL-DPDCH), and the DL-DPDCH transmits user data and signaling information from the upper layer. The TPC 112, the TFCI 114, and the Pilot 116 constitute a downlink dedicated physical control channel (DL-DPCCH). The TPC 112 is a field for transmitting a command for controlling transmission power of uplink channels transmitted from the UE to the Node B, and the Pilot 116 is a field for enabling the UE to measure transmission power of a downlink signal for power control on the downlink signal. Further, the TFCI 114 is a field for transmitting a codeword indicating that transport channels having different data rates are transmitted over the DL-DPCH. The transmitted TFCI corresponds to one of 1024 TFCs (Transport Format Combinations).

The W-CDMA system uses a (32,10) coding scheme in order to increase reliability of transmitting the TFCI. The 1024 TFCs are represented by a 10-bit binary sequence, and the 10-bit binary sequence is coded into 32 coded symbols by a (32,10) coder. Among the 32 coded symbols, 2 coded symbols are punctured, and then, each slot transmits 2 coded symbols to the UE in a frame unit. That is, since each radio frame is comprised of 15 slots, it can transmit a total of 30 bits. Therefore, the 32 coded symbols are transmitted after 2 coded symbols are punctured. In addition, when the DL-DPCH is assigned in association with the DSCH, a TFCI for the DSCH and a TFCI for the DL-DPCH are transmitted simultaneously.

There are two methods for transmitting the TFCI 114 by separating it into the TFCI for the DSCH and the TFCI for the DPCH. As for the TFCI 114, 30 coded symbols are transmitted for one frame as stated above, and the 30 coded symbols constitute one TFCI codeword. Therefore, the TFCI 114 comprised of the 30 coded symbols should be divided into two TFCIs. A first method is called "logical split mode method" for logically separating (splitting) the 30 coded symbols instead of previously separating the TFCI into the TFCI for the DSCH and the TFCI for the DL-DPCH. A second method is called a "hard split mode method" for transmitting the 30 coded symbols by separating them into the TFCI for the DSCH and the TFCI for the DPCH. A detailed description of the two methods will be made herein below.

In the logical split mode, after decoding a 10-symbol TFCI codeword from the received 30 coded symbols, the UE analyzes some of the 10 decoded coded symbols for the DL-DPCH and analyzes the other coded symbols for the DSCH. In the hard split mode, some of the 30 coded symbols are transmitted as a TFCI for the DL-DPCH and the other coded symbols are transmitted as a TFCI for the DSCH, and then, the TFCIs are subject to separate decoding processes.

FIG. 2 illustrates downlink and uplink signal flows for the case where a UE receiving a DSCH is located in a soft handover zone, wherein for simplicity, only two Node Bs are considered. It is assumed herein that the respective Node Bs belong to different RNCs (Radio Network Controllers). The Node B and the RNC, terms used in the 3$^{rd}$ generation W-CDMA mobile communication standard, are elements of a UTRAN (UMTS (Universal Mobile Telecommunication System) Terrestrial Radio Access Network). The term "UTRAN" refers to all of the elements in the W-CDMA standard excepting the UE. The term "Node B" refers to a base station, and the term "RNC" refers to an element of the UTRAN, for controlling the Node B.

A soft handover (SHO) occurs due to mobility of a UE 211. When the UE 211 moves away from a current Node B in communication with the UE 211, and at the same time moves to an area where it can receive signals from an adjacent new Node B, the UE receives the signals not only from the current Node B but also from the new Node B. This state is called a handover state. In this state, if a quality (or level) of the signal received from the current Node B is less than a predetermined threshold, the UE releases the channel established to the current Node B, and then establishes a new channel to the new Node B providing high-quality signals, thus performing the handover process. By doing so, it is possible to maintain a call without interruption.

If the UE 211 arrives at a soft handover zone, the current Node B in communication with the UE 211 decreases its transmission power. This is to provide a smooth handover between the UE 211 and the current Node B. The UE 211 then performs simplex or weighted summation on the transmission power levels of the current Node B and the new Node B. Thereafter, the UE 211 requests both of the Node Bs to control their transmission power levels proper for the summed value. By doing so, it is possible to decrease not only a transmission power level of a signal transmitted from the Node B to the UE 211 in an active region but also a transmission power level of a signal transmitted from the UE 211 to the Node B in the active region, contributing to a decrease in interference between adjacent UEs and between adjacent Node Bs.

Referring to FIG. 2, a Node B1 201 serves as a primary Node B transmitting the DSCH and its associated DL-DCH to the UE 211, while a Node B2 203 serves as a secondary Node B transmitting only the DL-DCH to the UE 211 due to movement of the UE 211. A set of the Node Bs set to transmit signals to the UE 211 existing in an SHO zone is called an "active set". When the UE 211 receiving the DSCH exists in the SHO zone, a problem occurs when the UE 211 receives the DSCH and the DL-DCH from the Node B1 201, but only receives the DL-DCH from the Node B2 203.

Here, the typical reason that the DSCH does not support the soft handover is because compared with the DL-DCH, the DSCH transmits data at a relatively high data rate, thus consuming an increased number of channel resources of the Node B. As a result, system capacity is affected. In order to enable the DSCH to support the soft handover, all of the Node Bs in the active set should have an algorithm for supporting the DSCH. However, to realize the algorithm, the Node Bs must be synchronized with one another. In addition, the W-CDMA mobile communication system may have a timing problem due to non-synchronization between the Node Bs. In order to support the SHO, the DSCH shared by a plurality of the UEs requires elaborate scheduling for the time points where it is used by the respective UEs. In light of the scheduling, it is difficult to embody transmission of the DSCH from the new Node B to the UE.

The DL-DCHs transmitted from the Node B1 201 and the Node B2 203 are received at the UE 211, and then subjected to soft combining. Here, "soft combining" refers to combining the signals received at the UE through different paths. The soft combining is aimed at reducing the interference, which affects the signals received at the UE 211, by summing the same information received through the different paths and then analyzing the summed value.

The soft combining is available only when the UE 211 receives the same information from the different Node Bs. However, when the UE 211 receives different information from the Node Bs, the received information, though subjected to soft combining, will be recognized as a noise component, resulting in an increase in the noise component of the signal. In the process of analyzing the DL-DCH, the downlink signals transmitted to the UE 211 from the respective Node Bs, i.e., the Node B1 201 and the Node B2 203, are subjected to soft combining except for the TPC bits 112 shown in FIG. 1B. The reason that the TPC 112 is analyzed separately rather than being analyzed by soft combining is because the TPCs received at the UE 211 from the respective Node Bs may be different from each other, since the signal received at the Node B1 201 from the UE 211 is high in level while the signal received at the Node B2 203 from the UE 211 is low in level, or vice versa, due to movement of the UE 211. Therefore, the TPC 112 is analyzed through a separate TPC analysis algorithm for a plurality of the Node Bs, rather than being subjected to soft combining.

As stated above, since the other fields of the DL-DCH except for the TPC field 112 are subject to soft combining, even the TFCI parts in the DL-DCHs transmitted from the Node B1 201 and the Node B2 203 are also subject to soft combining. That is, since the Node B1 201 transmits both the DL-DCH and the DSCH to the UE 211, it also transmits the TFCI for the DL-DCH and the TFCI for the DSCH.

The TFCI transmission method, as stated above, is divided into the logical split mode method and a hard split mode method. In the logical split mode, the UE 211 first decodes 30 TFCI coded bits received, and then separately uses the TFCI for the DL-DCH and the TFCI for the DSCH. Therefore, according to the W-CDMA standard, even though the Node B1 201 and the Node B2 203 belong to different RNCs, the Node B1 201 and the Node B2 203 can transmit the same TFCI coded bits. However, when the W-CDMA system transmits the TFCI for the DSCH in the hard split mode, no specification has been defined on a signaling method for transmitting the TFCI value for the DSCH to a Node B belong to another RNC. Therefore, when the Node B1 201 and the Node B2 203 in the active set of the UE 211 belong to different RNCs, the Node B2 203 does not recognize the TFCI value of the DSCH.

As stated above, since the UE 211 subjects the TFCI to soft combining after reception, the TFCI for the DSCH received at the UE 211 includes only the TFCI from the Node B1 201, unless the Node B2 203 transmits the TFCI for the DSCH. Therefore, the DL-DCHs received at the UE 211 from the Node B1 201 and the Node Be 203 are subject to soft combining, and then power controlled by the UE 211 considering a soft combined value. In contrast, as to the TFCI for the DSCH, the UE 211 considers only the Node B1 201, so that the UE 211 receives signals at unstable power. In this case, the TFCI for the DSCH may not be correctly analyzed.

SUMMARY OF THE INVENTION

It is, therefore, an object of the present invention to provide an apparatus and method for enabling a UE receiving a DSCH to correctly receive a TFCI for the DSCH in a soft handover zone.

It is another object of the present invention to provide an apparatus and method for enabling a Node B transmitting a DSCH to reliably transmit a TFCI for the DSCH in a soft handover zone.

It is further another object of the present invention to provide an apparatus and method in which in transmitting a TFCI for a DSCH, an RNC determines a relative power offset of the TFCI for the DSCH considering the number of Node Bs other than a primary Node B transmitting the DSCH, and controls transmission power of the TFCI for the DSCH using the determined relative power offset.

It is yet another object of the present invention to provide an apparatus and method in which a UE receiving a DSCH measures a level of a common pilot signal and a level of a pilot signal from each Node B in an active set, and transmits the measured value to an RNC transmitting the DSCH, so that the RNC can control a transmission power level of the DSCH transmitted from a Node B based on data received from the UE.

It is still another object of the present invention to provide an apparatus and method for transmitting information so that a UE receiving a DSCH can control a transmission power level of a TFCI for the DSCH transmitted from a primary Node B, using a FBI (FeedBack Information) field in a UL-DCH.

It is still another object of the present invention to provide an apparatus and method in which a UE receiving a DSCH encodes data used for controlling transmission power of a TFCI for the DSCH before transmitting the data to a Node B, thus to increase transmission reliability of the data.

It is still another object of the present invention to provide an apparatus and method in which a UE receiving a DSCH determines data to be transmitted over an FBI field of a UL-DCH for controlling transmission power of a TFCI for the DSCH by measuring a level of a common pilot signal and a level of a pilot signal from each Node B in an active set.

To achieve the above and other objects, there is provided a method for determining transmission power of a second TFCI bit indicating transport format information of data on a downlink shared channel transmitted from a selected Node B to a UE in a mobile communication system including the UE existing in a handover zone and a plurality of Node Bs in an active set indicating Node Bs capable of communicating with the UE. The Node Bs transmit dedicated channel data including a first TFCI bit to the UE over dedicated channels. A first Node B among the Node Bs transmits dedicated channel data including the first TFCI bit and the second TFCI bit over a dedicated channel and transmits downlink shared channel data over the downlink shared channel. A dedicated channel frame from the first Node B has a plurality of time slots. Each of the time slots include a transmission data field and a TFCI field indicating transport format information of the transmission data, while each of the TFCI fields include a first field where the first TFCI bit indicating transport format information of the dedicated channel data transmitted over the dedicated channels is located and a second field where the second TFCI bit indicating transport format information of the downlink shared channel data transmitted over the dedicated shared channel is located. The first Node B determines a transmission power level of the second TFCI bit to be higher than a ratio of transmission power of the dedicated channel data from a Node B transmitting only the dedicated channel data to transmission power of the first TFCI bit.

Preferably, the transmission power of the second TFCI bit is determined based on a number of Node Bs in the active set of the UE and a type of the Node Bs.

Also, it is preferable that the second TFCI bit is transmitted using a site selection diversity (SSDT) signal.

BRIEF DESCRIPTION OF THE DRAWINGS

The above and other objects, features and advantages of the present invention will become more apparent from the following detailed description when taken in conjunction with the accompanying drawings in which:

FIG. 5 illustrates a method for setting transmission power of a DL-DCH transmitted from a Node B to a UE in the W-CDMA system;

FIG. 25 illustrates a structure of the Radio Link Setup message;

FIG. 26 illustrates a structure of the Radio Link Setup message for the case where the power offset value of the TFCI for the DSCH is set to be different from the power offset value of the TFCI for the DCH; and FIG. 27 illustrates a structure of a Radio Link Reconfiguration message to which a power offset value is added.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1A:
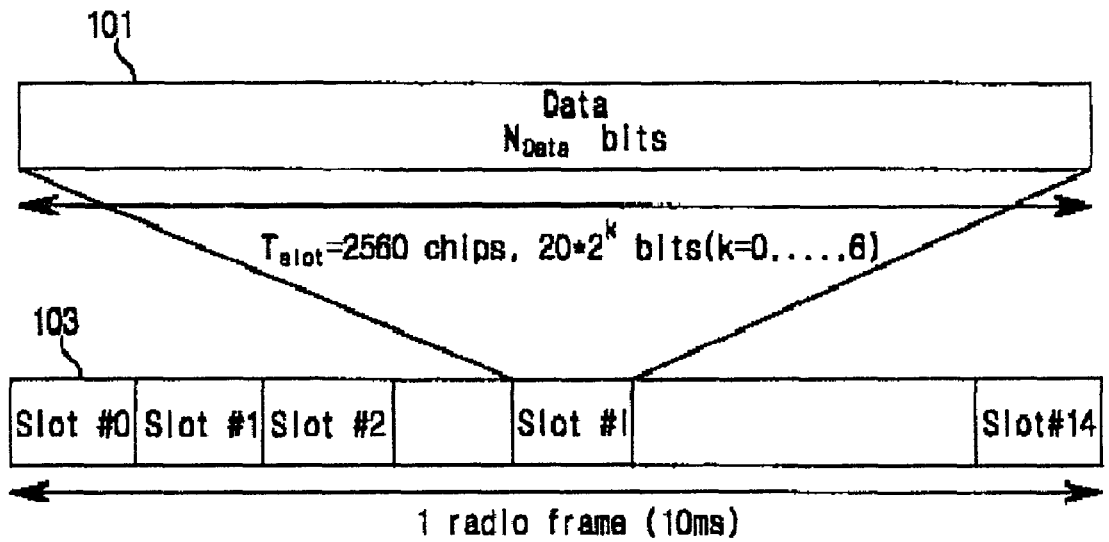
FIGS. 1A and 1B illustrate a structure of a downlink shared channel (DSCH) and its associated downlink dedicated channel (DL-DCH)
Figure 1B:
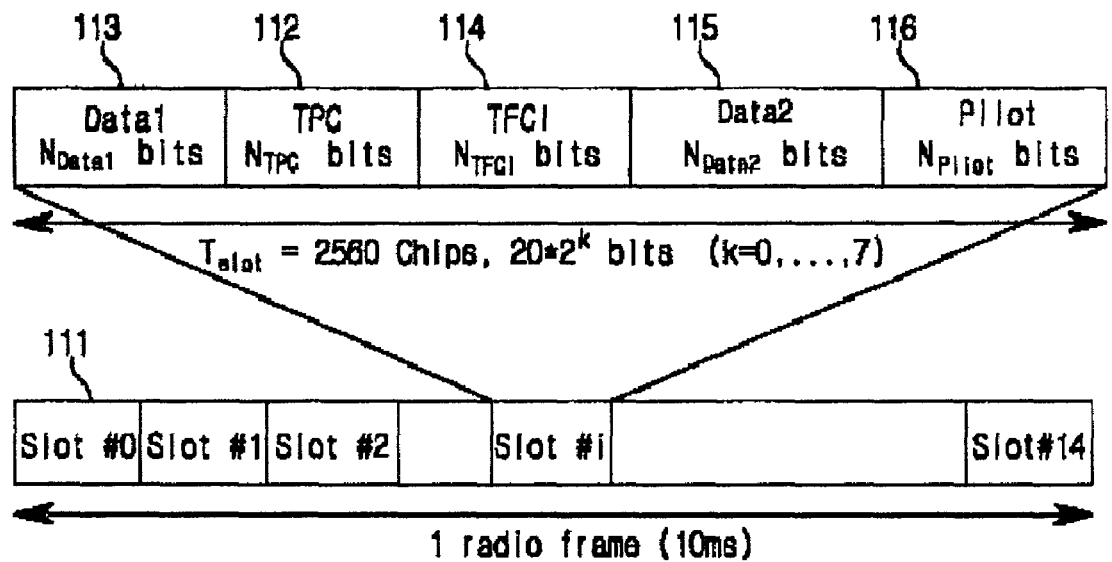
Figure 2:
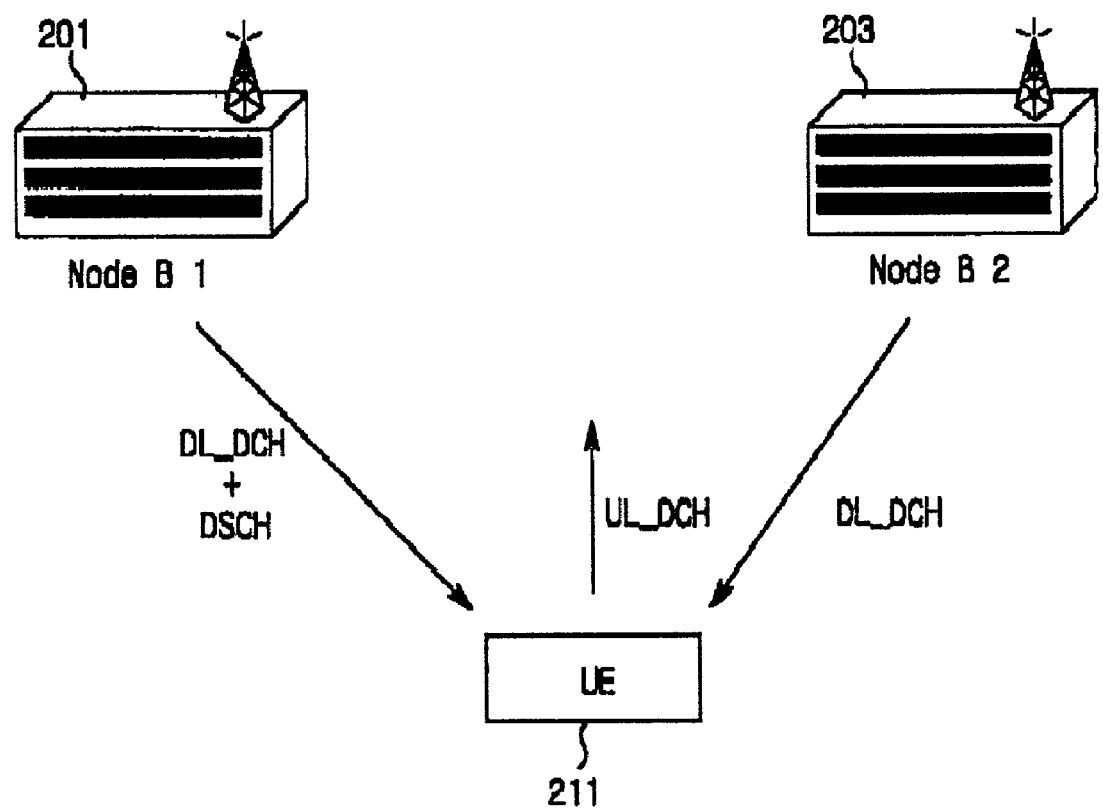
FIG. 2 is a diagram for explaining a problem occurring during DSCH power control in a soft handover (SHO) zone.
Figure 3:
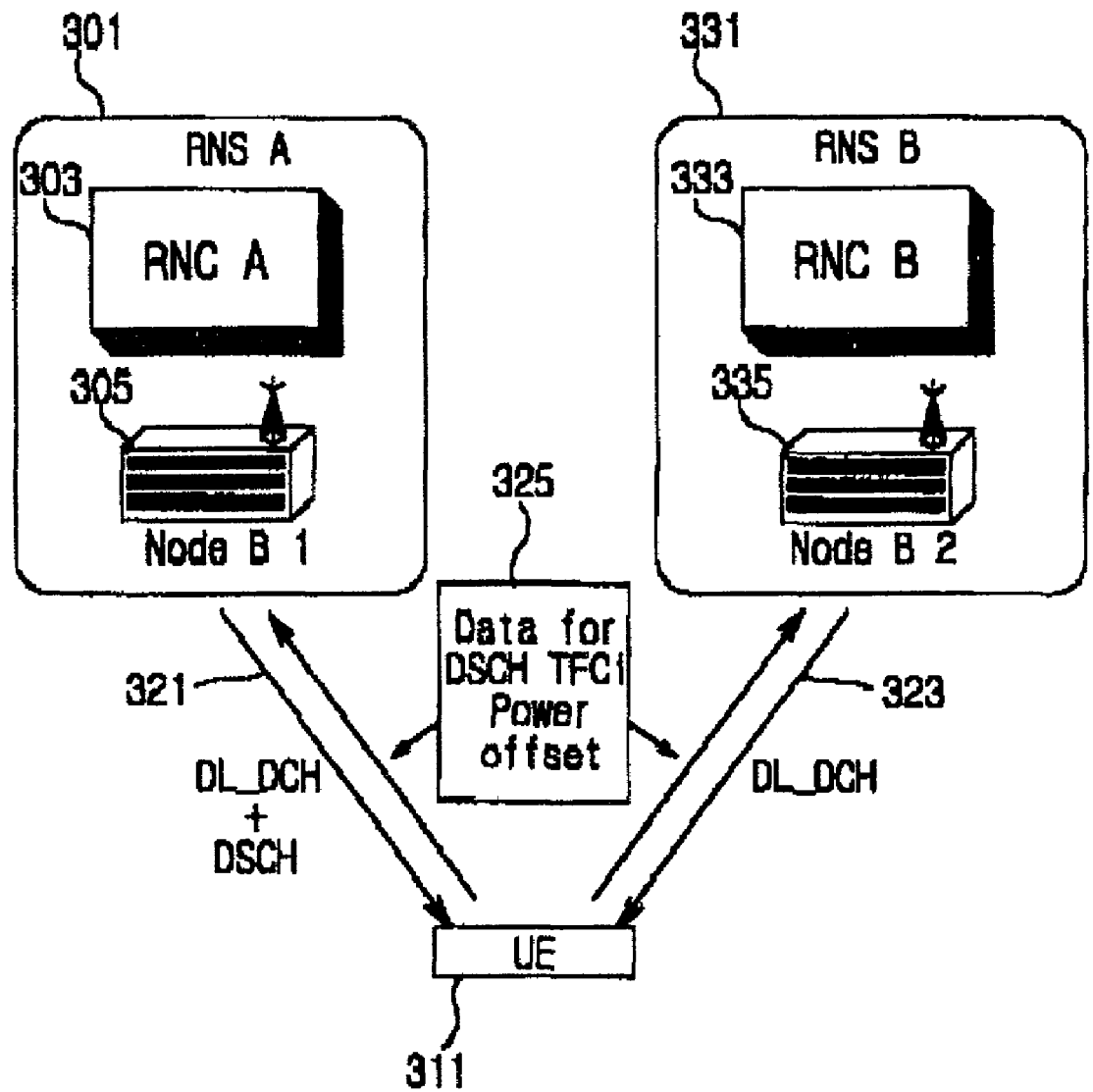
FIG. 3 is a diagram for explaining a problem occurring during DSCH power control in an SHO zone.

FIG. 3 illustrates downlink and uplink signal flows for the case where a UE receiving a DSCH is located in a soft handover zone, wherein for simplicity, it is assumed that only two Node Bs are registered in an active set of the UE. Further, it is also assumed that the respective Node Bs belong to different RNCs, and a TFCI is transmitted in the hard split mode.

In FIG. 3, the term "RNS (Radio Network System)" refers to a combined device of an RNC and a Node B controlled by the RNC in the W-CDMA standard. An RNS A 301 includes an RNC A 303 and a Node B1 305 controlled by the RNC A 303, while an RNS B 331 includes an RNC B 333 and a Node B2 335 controlled by the RNC B 333.

Referring to FIG. 3, a UE 311 has the Node B1 305 and the Node B2 335 registered in its active set. The UE 311 receives a DL-DCH plus a DSCH, represented by 321, from the Node B1 305 and only a DL-DCH 323 from the Node B2 335. In the prior art, since the TFCI for the DSCH and the TFCI for the DL-DCH are transmitted at the same transmission power, the UE 311 may not correctly analyze the received TFCI for the DSCH. At this moment, the RNC A 303 applies a transmission power offset to the TFCI part for the DSCH in the DL-DCH transmitted by the Node B1 305. The transmission power offset of the TFCI for the DSCH can be determined by either the RNC A 303 or information 325 transmitted by the UE 311 receiving the DSCH.

Figure 4:
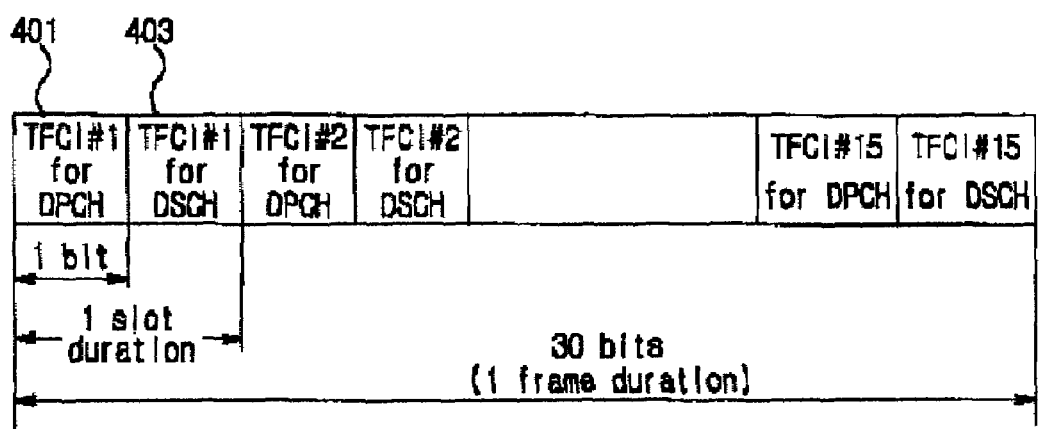
FIG. 4 illustrates a structure of the TFCI transmitted by a primary Node B.

A structure of the TFCI transmitted by the Node B1 305 is shown in FIG. 4. The TFCI value of FIG. 4 is determined by the RNC A 303 of FIG. 3. It is assumed in FIG. 4 that the number of TFCI codewords for the DSCH is equal to the number of TFCI codewords for the DL-DCH in the hard spilt mode of transmitting the TFCI. That is, in the split mode, the number of TFCIs for the DL-DCH and the number of TFCIs for the DSCH are variable in (k,10−k), where k indicates the number of the TFCIs for the DL-DCH, '10−k' indicates the number of TFCIs for the DSCH, and 'k' is an integer between 1 and 9. In FIG. 4, reference numeral 401 indicates the TFCI codewords for the DL-DPCH and reference numeral 403 indicates the TFCI codewords for the DSCH.

FIG. 4 illustrates TFCI codewords transmitted for one 10 ms-radio frame. In one-radio frame duration, 30 TFCI codewords are transmitted, and in one-slot duration, two bits are transmitted. As illustrated in FIGS. 3 and 4, although the Node B2 335, a secondary Node B transmitting the TFCI to the UE 311, recognizes the TFCI value for the DL-DPCH, it does not recognize the TFCI value for the DSCH. Therefore, in the TFCI transmission format shown in FIG. 4, only the TFCIs for the DL-DPCH are transmitted, while the TFCIs for the DSCH are not transmitted.

The concept of the present invention shown in FIG. 4 will be described in detail with reference to FIGS. 5 and 6.

FIG. 5 illustrates a method for setting transmission power of a DL-DCH transmitted from a Node B to a UE in the W-CDMA system. In FIG. 5, Data1 501 and Data2 504 transmitted at transmission power P (511), and the transmission power P (511) is determined depending upon QoS (Quality of Service) of TPC 502 transmitted by the UE 311, and QoS of data transmitted as the Data1 501 and the Data2 504. The TPC 502, TFCI 503 and Pilot 505 are transmitted at transmission power levels determined by applying transmission power offsets $P_{offset1}$ (512), $P_{offset2}$ (513) and $P_{offset3}$ (514) to the transmission power P (511) of the Data1 501 and the Data2 504. Values of the $P_{offset1}$, $P_{offset2}$ and $P_{offset3}$ are determined in the Node B or upper layer.

Figure 6A:
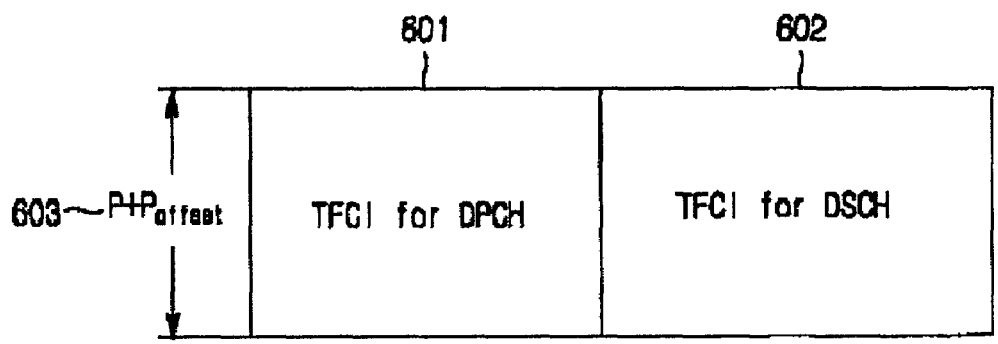
FIG. 6A illustrates a conventional method for transmitting the TFCI.

A conventional method for transmitting the TFCI 503 is illustrated in FIG. 6A. Referring to FIG. 6A, a TFCI 601 for the DPCH and a TFCI 602 for the DSCH are transmitted at transmission power $P+P_{offset2}$ (603) determined by adding the transmission power offset $P_{offset2}$ (513) determined by the upper layer to the transmission power P (511) of the data part. As illustrated, the transmission power of the TFCI 601 for the DPCH is equal to the transmission power of the TFCI 602 for the DSCH. In this case, if the TFCIs are transmitted in the hard split mode and the Node Bs in the active set of the UE belong to different RNCs, reception power of the TFCI for the DSCH received at the UE may be insufficient. A method solving this problem is illustrated in FIGS. 6B and 6C.

Figure 6B:
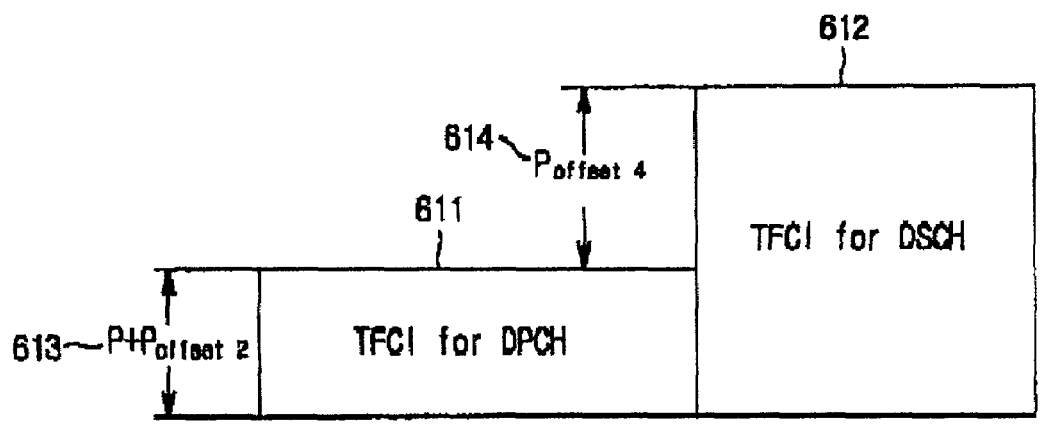
FIG. 6B illustrates a method for transmitting a TFCI for the DPCH and a TFCI for the DSCH at different transmission power.

FIG. 6B illustrates a method for transmitting a TFCI 611 for the DPCH and a TFCI 612 for the DSCH at different transmission power. The TFCI 611 of the DPCH is transmitted at transmission power $P+P_{offset2}$ (613) determined by adding the transmission power offset $P_{offset2}$ (513) determined by the upper layer to the transmission power P (511) of the data part as in the prior art. However, the TFCI 612 for the DSCH is transmitted at transmission power $P+P_{offset2}+P_{offset4}$, where the power offset $P_{offset4}$ (614) is applied only to the TFCI for the DSCH. The power offset $P_{offset4}$ for the TFCI for the DSCH can be determined by either the RNC transmitting the DSCH or information transmitted by the UE receiving the DSCH.

Figure 6C:
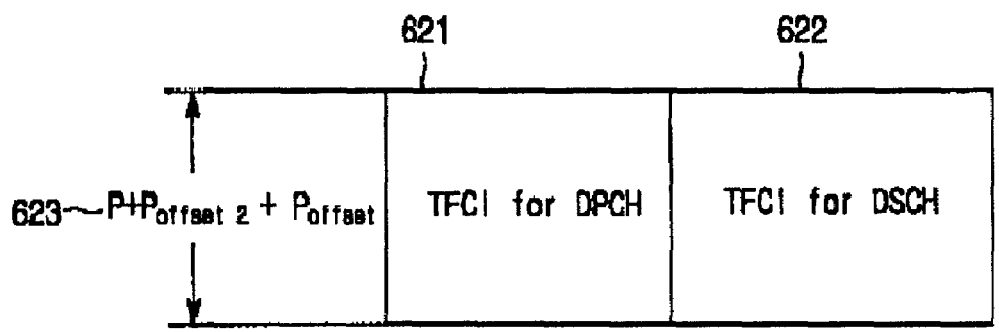
FIG. 6C illustrates a method for transmitting a TFCI for the DPCH and a TFCI for the DSCH at the same transmission power.

FIG. 6C illustrates a method for transmitting a TFCI 621 for the DPCH and a TFCI 622 for the DSCH at the same transmission power. This method is, however, different from the conventional method in that the transmission power of the TFCI for the DPCH is matched (increased) to the transmission power of the TFCI 612 for the DSCH shown in FIG. 6B. That is, the transmission power of the TFCI is determined by adding the transmission power offset $P_{offset2}$ of the TFCI for the DPCH and the transmission power offset $P_{offset4}$ of the TFCI for the DSCH to the transmission power P of the data part. In this method, the UE reception power of the TFCI for the DPCH may be somewhat excessive. However, since a part occupied by the TFCI in one DL-DPCH slot is very small, an interference noise caused by the excessive reception power of the TFCI part is insignificant. Meanwhile, the reception power of the TFCI for the DSCH is high enough to correctly analyze the TFCI for the DSCH, thus preventing incorrect analysis of the TFCI for the DSCH.

Summarizing the invention described with reference to FIGS. 3 to 6C, if a UE receiving the DSCH exists in a handover zone, Node Bs in an active set of the UE belong to different RNCs and a TFCI for the DSCH is transmitted in the hard split mode, then UE reception power of the TFCI for the DSCH received from the primary Node B may not be high enough to correctly analyze the TFCI for the DSCH. Therefore, a separate power offset is used in setting the transmission power of the TFCI for the DSCH.

There are three possible methods for determining the separate power offset. In a first method, the UE reports information on a channel condition between the UE and each Node B in the current active set to the UTRAN, so that the UTRAN determines a power offset value for the DSCH. In a second method, the UE determines a power offset value for the DSCH by measuring the channel environment between the UE and each Node B in the current active set, and then reports the determined power offset value to the UTRAN. In a third method, the UTRAN determines a power offset value to be applied to the DSCH according to the types of the Node Bs in the current active set of the UE. A detailed description of these methods will be given herein below.

The first method can be performed by using a TFCI power offset for the DSCH determined by a site selection diversity (SSDT) signal used in the conventional W-CDMA system. In addition, the method can also use several variable TFCI power offsets for the DSCH. That is, in addition to the measured value reported by the UE, the UTRAN determines a transmission power offset of the TFCI for the DSCH according to the number and type of the Node Bs in the active set of the UE. The "number of the Node Bs" indicates the number of Node Bs in the active set and the "type of the Node B" indicates whether the Node B in the active set belongs to the same RNC as the Node B transmitting the DSCH.

In the SSDT scheme, the UE located in the soft handover zone assigns temporary identifications (IDs) to the respective Node Bs in the active set of the UE, and then selects a Node B providing the best reception quality to the UE as a primary transmitter. Further, only the Node B selected as the primary transmitter transmits the DL-DPDCH to the UE, and the other Node Bs transmit only the DL-DPCCH, thereby reducing an interference signal caused when the UE simultaneously receives the DL-DPDCHs transmitted by all of the Node Bs in the active set.

In the SSDT scheme, the Node B transmitting the DL-DPDCH is called a "primary Node B", and the primary Node B is periodically updated by measurement information of common pilot channels (CPICHs) transmitted from every Node B in the active set. In sum, to update the primary Node B in the SSDT scheme, after first assigning a temporary identification to every Node B, the UE monitors a power level of the CPICH from every Node B in the active set, transmits a temporary identification assigned to a Node B having the highest signal level to every Node B in the active set through an FBI (FeedBack Information) field, and then selects the Node B as a primary Node B. This process is repeated to update a Node B having the highest signal level as the primary Node B.

In the method for determining transmission power of the TFCI for the DSCH using the SSDT, the RNC or the Node B determines a power offset to be applied to the TFCI for the DSCH according to whether a Node B indicated by the temporary identification transmitted by the UE indicates the Node B transmitting the DSCH. That is, if the Node B indicated by the temporary identification transmitted by the UE indicates the Node B transmitting the DSCH, the RNC or the Node B determines transmission power of the TFCI for the DSCH to be equal to or slightly larger than the transmission power of the TFCI for the DL-DCH. In the opposite case, the RNC or the Node B applies a fixed power offset to a level of the transmission power of the TFCI for the DSCH.

In the transmission power determining method using the SSDT, if the Node B transmitting the DSCH is a primary Node B, it means that the channel between the Node B and the UE is in the best condition. In this case, no TFCI power offset for the DSCH is required or slightly increased transmission power is used. However, if the Node B is not a primary Node B, it means that the channel between the Node B and the UE receiving the DSCH is in a bad condition. In this case, a large TFCI power offset value for the DSCH is required.

Further, in the transmission power determining method using the SSDT, the UTRAN uses a fixed TFCI power offset value for the DSCH. That is, the UTRAN uses the fixed TFCI power offset value for the DSCH according to whether the Node B transmitting the DSCH is a primary Node B. Alternatively, it is also possible to use a variable power offset determined according to a variation in the channel environment between the UE and the Node Bs in the active set of the UE in transmitting the TFCI for the DSCH, instead of using the fixed power offset. The method for applying a variable power offset to the TFCI for the DSCH will be described herein below.

The UE receiving the DSCH reports to the UTRAN information on the channel environments between the current UE and the Node Bs in the active set. The UTRAN then receives information on the channel environments between the UE and the Node Bs in the active set, and information on the channel environment between the UE and the Node B transmitting the TFCI for the DSCH, the information being transmitted from the UE. The UTRAN determines a proper power offset to be used by the Node B intended to transmit the TFCI for the DSCH to the UE, based on the received information, and then transmits the determined power offset information to the Node B.

In the method where the UTRAN determines information on a power offset to be used in transmitting the TFCI for the DSCH using the information transmitted by the UE, the UE determines the transmission information using a value determined by measuring a common pilot channel received from each Node B in the active set and a signal level of a pilot field in the downlink dedicated channel (DL-DCH). Measuring the common pilot channel and the pilot field in the downlink dedicated channel is performed when the UE determines information to be transmitted to the UTRAN.

As an example of the process for determining the information to be transmitted to the UTRAN by the UE, if a signal level of the currently received common pilot channel signal is higher than a signal level of the previous common pilot channel from the Node B transmitting the DSCH to the UE, the UE decides that the channel is in a good condition, and then transmits information on the current channel environment to the UTRAN. For a better understanding of the invention, reference will be made to Table 1. It is assumed in Table 1 that the number of information bits transmitted from the UE to the UTRAN is 6, the number of Node Bs in the active set of the UE is 2, and the Node Bs in the active set belong to different RNCs. In addition, it is assumed that for the current channel condition information, a code for the SSDT used in the W-CDMA system is used. Alternatively, it is also possible to use a separate coding method proposed by the invention, instead of using the code for the SSDT. A coding method for the SSDT or the separate coding method proposed by the invention will be described in detail when reference is made to the second method for determining the power offset of the TFCI for the DSCH. Further, it is assumed that the UE transmitting the channel condition information to the UTRAN determines the channel condition based on a signal level of the common pilot channel at the time when it first enters the soft handover zone, and since then, the UE determines the channel condition based on a signal level of the common pilot channel at the time when it transmits the channel condition information to the UTRAN.

TABLE 1

| Difference Between Reference value and Measured Value (Signal Level of CPICH) | Channel Condition (Determined by UE) | Tx Code | Power Offset Applied to UTRAN |
| --- | --- | --- | --- |
| 6 dB and over | Very Bad | 00000 | 4 dB |
| 4 dB and over | Considerably Bad | 01001 | 3 dB |
| 2 dB and over | Bad | 11011 | 2 dB |
| 0 dB and over | Normal | 10010 | 1 dB |
| −2 dB and over | Good | 00111 | 0 dB |
| −4 dB and over | Very Good | 01110 | −2 dB |

In Table 1, the UTRAN can also determine a power offset to be used for transmission of the TFCI for the DSCH by analyzing a signal indicating the current channel condition received from the UE at stated periods. Alternatively, the UTRAN can also determine the power offset to be used for transmission of the TFCI for the DSCH by analyzing a change of the information received several times. In Table 1, the reason that the UTRAN determines a value of the power offset applied to the TFCI for the DSCH to be lower than a difference between a reference value and the signal level of the CPICH measured by the UE is to abruptly change the transmission power of the TFCI for the DSCH transmitted to the UE. As occasion demands, the UTRAN can also determine the power offset value to be equal to or larger than the difference between the reference value and the signal level of the CPICH measured by the UE.

The method for determining the power offset value to be lower than the difference between the reference value and the signal level of the CPICH signal, a first method among the methods for determining a power offset value to be applied to the transmission power of the TFCI for the DSCH, can desirably reduce a level of an interference signal which affects a signal from an adjacent Node B. Undesirably, however, the transmission power level of the TFCI for the DSCH is lower than a proper transmission power level.

The method for determining the power offset value to be equal to the difference between the reference value and the level of the CPICH signal, a second method among the methods for determining a power offset value to be applied to the transmission power of the TFCI for the DSCH, can desirably apply the change in power level of the signal received at the UE. Undesirably, however, the power offset to be applied to the TFCI for the DSCH is determined without considering the difference between data rates of the DPCH and the CPICH.

The method for determining the power offset value to be larger than the difference between the reference value and the level of the CPICH signal, a third method, can increase the transmission power of the TFCI for the DSCH to be transmitted to the UE, so that the UE can receive the signal rapidly at proper power.

In addition to the signal level of the common pilot channel from the Node B transmitting the DSCH used in Table 1, it is also possible to use, as the measured value used by the UE to determine the current channel condition, (i) a level of the common pilot channel signal from every Node B in the active set, (ii) a difference between a level of the common pilot channel signal from the Node B transmitting the DSCH in the active set and the highest signal level among the signal levels of the common pilot channels from the Node Bs other than the Node B transmitting the DSCH, (iii) a signal level of a pilot field in the DL-DPCCH from the Node B transmitting the DSCH, (iv) a signal level of a pilot field in the DL-DPCCH transmitted from every Node B in the active set, and (v) a difference between a level of the pilot signal on the DL-DPCCH from the Node B transmitting the DSCH in the active set and the highest signal level among the signal levels of the common pilot channels from the Node Bs other than the Node B transmitting the DSCH.

In the second method among the methods for determining the transmission power offset of the TFCI for the DSCH, the UE measures the channel environments between the UE and the Node Bs in the active set, determines the transmission power offset of the TFCI for the DSCH using the measured value, and then transmits the determined power offset information to the UTRAN. The difference between the second method and the first method is as follows. In the first method, the transmission power offset of the TFCI for the DSCH is determined by the RNC. In the second method, however, the UE measures the current channel condition in person, determines a power offset level depending on the measured channel condition, and then transmits the determined power offset information to the UTRAN, so that the UTRAN determines the transmission power offset of the TFCI for the DSCH.

In the second method, the UE estimates the channel condition between the UE and each Node B by measuring a reception power level of the CPICH received from each Node B in the active set of the UE and a reception power level of the pilot field in the DL-DPCCH, and determines the transmission power offset of the TFCI for the DSCH to be received, by determining whether the Node B belongs to the same RNC as the Node B transmitting the DSCH.

In determining the transmission power offset of the TFCI for the DSCH, the UE can either transmit the transmission power offset of the TFCI for the DSCH to the UTRAN using the SSDT used in the first method, transmit different transmission power offsets of the TFCI for the DSCH to the UTRAN in association with the 8 codewords used in the SSDT, or transmit the power offset of the TFCI for the DSCH to the UTRAN using the difference codewords in an FBI (FeedBack Information) field of the UL-DPCCH transmitting the SSDT code.

Figure 7:
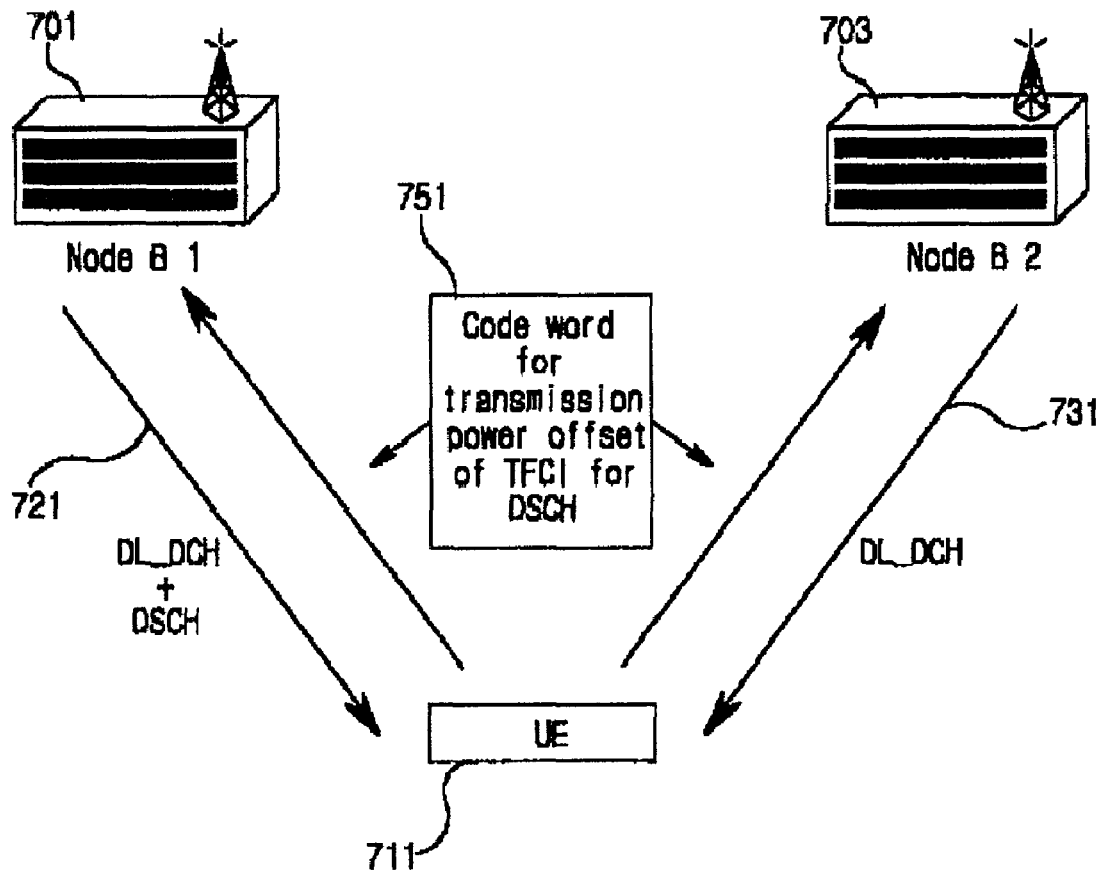
FIG. 7 illustrates a method for determining a transmission power offset of the TFCI for the DSCH by the UE.

The method for transmitting the transmission power offset of the TFCI for the DSCH using the SSDT will be described below. FIG. 7 illustrates a method for determining a transmission power offset of the TFCI for the DSCH by the UE, wherein for simplicity, it is assumed that the number of Node Bs in the active set of the UE is 2 and the respective Node Bs belong to different RNCs.

Referring to FIG. 7, a UE 711 receives a DSCH and a DL-DCH from a Node B1 701, and a DL-DCH from a Node B2 703, and transmits an UL-DCH to the Node B1 701 and the Node B2 703. The UL-DCH is transmitted by the UE 711 to every Node B in the active set. The Node B1 701 and the Node B2 703 receive the UL-DCH transmitted from the UE 711, and analyze the channel conditions with the UE 711 using the received UL-DCH.

In the method for transmitting the transmission power offset of the TFCI for the DSCH to the UTRAN using the SSDT, if the UE 711 enters a soft handover zone, the UE 711 receives common pilot channels from both the Node B1 701 and the Node B2 703, and selects a primary Node B from the Node B1 701 and the Node B2 703 by measuring signal levels of the received common pilot channels. A temporary identification of the Node B selected as the primary Node B is transmitted by the UE 711 to every Node B in the active set of the UE 711 through an FBI field of the UL-DCH. The Node B transmitting the DSCH among the Node Bs in the active set then determines the transmission power offset of the TFCI for the DSCH to be transmitted to the UE 711, by determining whether it is the primary Node B.

Figure 8A:
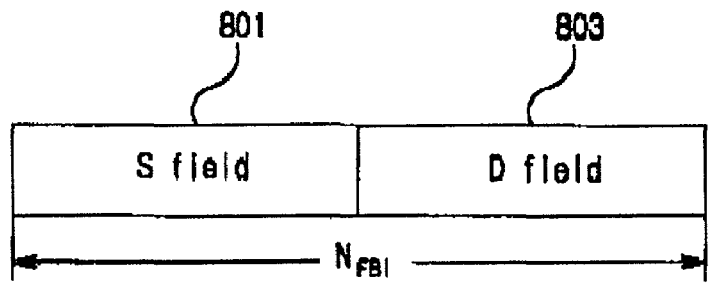
FIG. 8A illustrates structure of the FBI field.

A structure of the FBI field, as illustrated in FIG. 8A, is comprised of a total of 2 bits. Referring to FIG. 8A, reference numeral 801 represents an S field transmitted from the UE 711 to the Node B when the W-CDMA system uses a transmit antenna diversity, while reference numeral 803 represents a D field transmitted from the UE 711 to the Node B when the W-CDMA system uses the SSDT. The S field 801 has a length of 0 or 1 bit. If the S field 801 has a length of 0 bit the transmit antenna diversity is not used. The D field 803 has a length of 0, 1 or 2 bit(s). If the D field 803 has a length of 0 bit, the SSDT is not used. If the D field 803 has a length of 1 bit, the SSDT is used along with the transmit antenna diversity. If the D field 803 has a length of 2 bits, the SSDT is used independently. When the SSDT is used, the information transmitted with the FBI field is a codeword of the temporary identification indicating the primary Node B.

Table 2 and Table 3 illustrate SSDT codewords that are varied according to the length of the FBI field and the channel environments between the UE 711 and the Node Bs in the active set of the UE 711. The values shown in Tables 2 and 3 are codewords currently used in the W-CDMA system. Among the codewords shown in Tables 2 and 3, parenthesized coded bits represent the coded bits which are not transmitted when they cannot be transmitted within one frame because the DSCH radio frame used in the W-CDMA system is comprised of 15 slots.

TABLE 2

| | ID Code | | |
|---|---|---|---|
| ID Label | Long Code | Medium Code | Short Code |
| a | 000000000000000 | (0)0000000 | 00000 |
| b | 101010101010101 | (0)1010101 | 01001 |
| c | 011001100110011 | (0)0110011 | 11011 |
| d | 110011001100110 | (0)1100110 | 10010 |
| e | 000111100001111 | (0)0001111 | 00111 |
| f | 101101001011010 | (0)1011010 | 01110 |
| g | 011110000111100 | (0)0111100 | 11100 |
| h | 110100101101001 | (0)1101001 | 10101 |

Illustrated in Table 2 are SSDT codewords for the case when the 1-bit FBI is used, i.e., when the SSDT is used along with the transmit antenna diversity.

TABLE 3

| | ID Code | | |
|---|---|---|---|
| ID Label | Long Code | Medium Code | Short Code |
| a | (0)0000000 | (0)000 | 000 |
| | (0)0000000 | (0)000 | 000 |
| b | (0)0000000 | (0)000 | 000 |
| | (1)1111111 | (1)111 | 111 |
| c | (0)1010101 | (0)101 | 101 |
| | (0)1010101 | (0)101 | 101 |
| d | (0)1010101 | (0)101 | 101 |
| | (1)0101010 | (1)010 | 010 |
| e | (0)0110011 | (0)011 | 011 |
| | (0)0110011 | (0)011 | 011 |
| f | (0)0110011 | (0)011 | 011 |
| | (1)1001100 | (1)100 | 100 |
| g | (0)1100110 | (0)110 | 110 |
| | (0)1100110 | (0)110 | 110 |
| H | (0)1100110 | (0)110 | 110 |
| | (1)0011001 | (1)001 | 001 |

Illustrated in Table 3 are SSDT codewords for the case when the 2-bit FBI is used, i.e., when the SSDT is used independently.

The SSDT scheme selects Table 2 or Table 3 according to the number of FBI bits, and assigns the codewords shown in Table 2 or Table 3 to the Node Bs in the active set according to the selected mode, to use the assigned codewords as temporary identifications. In addition, the codewords are used when the UE 711 reselects the primary Node B at periods determined by the upper layer and transmits the temporary identification of the primary Node B to the Node Bs in the active set.

Figure 8B:
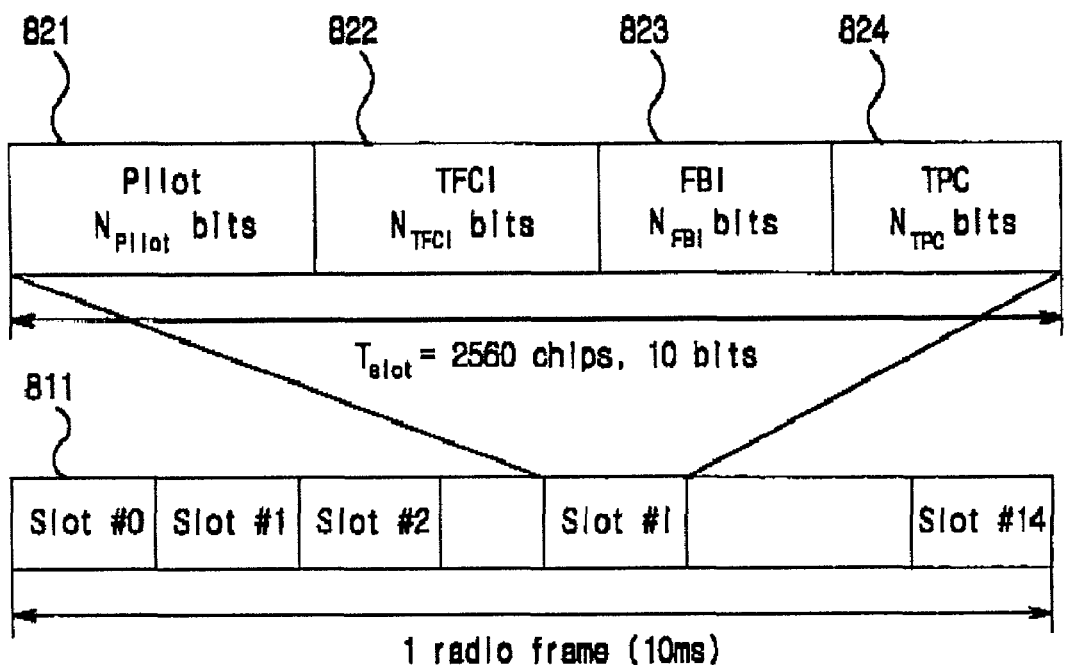
FIG. 8B illustrates a structure of the UL-DPCCH (Uplink Dedicated Physical Control Channel) transmitted along with the FBI field by the UE.

A structure of the UL-DPCCH (Uplink Dedicated Physical Control Channel) transmitted along with the FBI field by the UE 711 is illustrated in FIG. 8B. Referring to FIG. 8B, reference numeral 811 represents a structure of one radio frame of the UL-DPCCH included in the UL-DCH. The UL-DPCCH frame has various structures according to the lengths of Pilot 821, TFCI 822, FBI 823 and TPC 824. The Pilot 821 is used when the Node B estimate a channel environment between the UE 711 and the Node B and measures a level of a signal transmitted from the UE 711. The TFCI 822 is a field used for transmitting a TFCI codeword indicating that transport channels having different data rates are transmitted to the Node B over the DL-DPDCH (Uplink Dedicated Physical Data Channel). The FBI field 823 is a field for transmitting feedback information of the transmit antenna diversity and the SSDT. The TPC 824 is used when the UE 711 determines a power level of a downlink signal by receiving the signal from each Node B in the active set, and transmits corresponding TPC bits.

In the conventional method for transmitting the transmission power offset of the TFCI for the DSCH simply using the SSDT, only two transmission power offsets are available to the TFCI for the DSCH regardless of whether the transmission power offset of the TFCI for the DSCH is determined by the UTRAN or the UE. Therefore, the present invention provides a method for transmitting the SSDT ID code in association with the transmission power offset value of the TFCI for the DSCH or information based on which the transmission power offset of the TFCI for the DSCH is determined, so that when the UTRAN determines the transmission power offset of the TFCI for the DSCH, the UE transmits various information on the channel environments between the UE and the Node Bs in the active set, and when the UE transmits the transmission power offset of the TFCI for the DSCH, the UE transmits various transmission power offsets of the TFCI for the DSCH to be transmitted to the UTRAN. In addition, the present invention provides a method for using other codes instead of the SSDT ID codes, in transmitting by the UE the transmission power offset value of the TFCI for the DSCH or information based on which the transmission power offset of the TFCI for the DSCH is determined.

Therefore, the embodiment of the present invention transmits the SSDT codes of Table 2 and Table 3 in association with (i) information on the transmission power offset of the TFCI for the DSCH and (ii) information on the channel environment between the UE an the Node Bs in the active set, measured by the UE, or transmits the codes created in a separate coding mode in association with (i) information on a relative power offset and (ii) information on the channel environment between the UE and the Node Bs in the active set, measured by the UE.

Turning back to FIG. 7, the UE 711 measures common pilot channels and dedicated pilot fields of the DL-DCHs, transmitted from the Node B1 701 and the Node B2 703, determines the type of the currently measured Node B, i.e., whether the currently measured Node B belongs to the same RNC as the primary Node B transmitting the DSCH, and then transmits the power offset to be used for the TFCI for the DSCH or the channel information between the UE and the Node Bs in the active set to the Node B1 701 through the FBI field of the UL-DPCCH. The information transmitted through the FBI field of the UL-DPCCH is not related to the Node B2 703, a non-primary Node B, so that the Node B2 703 discards the information received through the FBI field. Upon receiving the power offset information to be used for the TFCI for the DSCH or the channel condition information between the UE and the Node Bs in the active set, transmitted through the UL-DPCCH, the Node B1 701 determines transmission power of the TFCI for the DSCH using the received power offset information to be used for the TFCI for the DSCH, or transmits the channel environment information between the UE receiving the DSCH and the Node Bs in the active set to the RNC and then transmits the TFCI for the DSCH to the UE 711 as determined by the RNC.

When the power offset information to be used for the TFCI for the DSCH is transmitted using the SSDT codewords of Table 2 and Table 3, the transmission period is determined according to a length of the SSDT codeword and the type of the SSDT codeword in use. The transmission period has the minimum value, when the 2-bit FBI field is used. In this case, if the short SSDT codeword shown in Table 3 is used, 6 bits must be transmitted. Since the SSDT codeword is comprised of 2 bits per slot, a total of 3 slots are required. In addition, the transmission period has the maximum value, when the 1-bit FBI field is used. In this case, if the long SSDT codeword shown in Table 2 is used, 15 bits must be transmitted. Since the SSDT codeword is comprised of 1 bit per slot, a total of 15 slots (i.e., one frame) are required.

In order to determine the transmission power offset of the TFCI for the DSCH, used in tie second method for determining the transmission power of the TFCI for the DSCH, various factors should be considered, and this can be represented by $$P_{TFCI\_for\_DSCH} = P_{TFCI\_for\_DPCH} + \text{Offset}_{kind\_and\_number\_ofNode\_B} + \text{Offset}_{channel\_environment} \quad \text{Equation (1)}$$

Equation (1) is used to calculate transmission power of the TFCI for the DSCH in the soft handover zone. When the TFCI for the DSCH is transmitted to the UE 711, the transmission power is determined by adding a power offset based on the type (kind) of number of the Node Bs in the active set of the UE and a power offset based on the channel environment between the UE and the Node Bs in the active set of the UE to the transmission power of the TFCI for the DPCH transmitted along with the TFCI for the DSCH in the soft handover zone.

If the UE 711 is located in a non-soft handover zone in Equation (1), the transmission power of the TFCI for the DSCH becomes equal to the transmission power of the TFCI for the DPCH. Equation (1) will be explained in detail with reference to FIG. 9.

Figure 9:
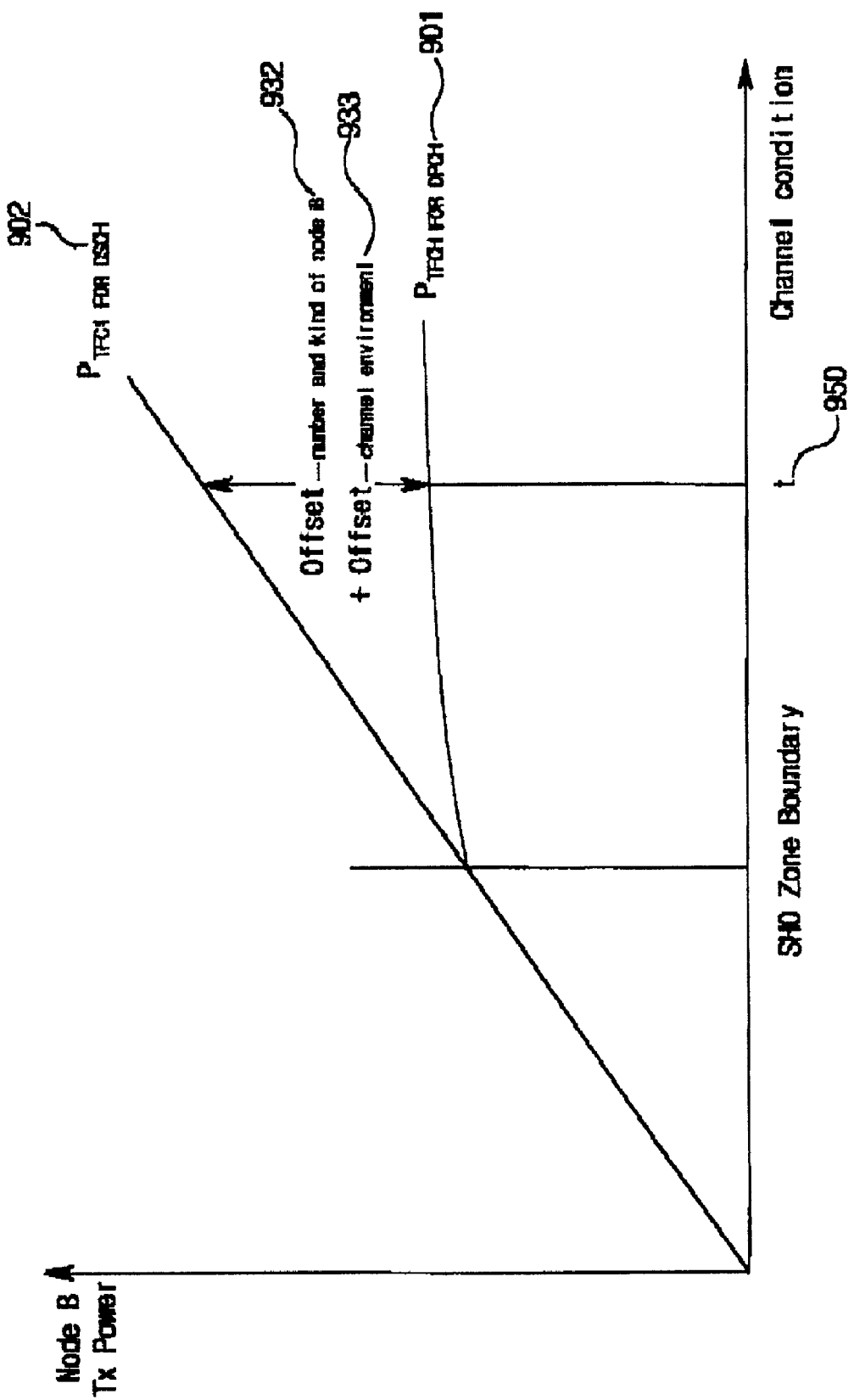
FIG. 9 illustrates a change in transmission power of the Node B transmitting the TFCI for the DSCH.

FIG. 9 illustrates a change in transmission power of the Node B transmitting the TFCI for the DSCH. Specifically, FIG. 9 illustrates the factors required to determine the transmission power of the TFCI for the DSCH at a time 't' (950). In FIG. 9, a line 902 represents transmission power of the TFCI for the DSCH, to be transmitted by the Node B considering the channel environment between the UE and the Node B regardless of whether the UE is located in the soft handover zone or not. The line 902 coincides with the transmission power of the TFCI for the DPCH, when the UE is located in the non-soft handover zone. That is, if the UE moves away from the SHO (soft handover) zone, the transmission power of the TFCI for the DSCH becomes equal to the transmission power of the TFCI for the DPCH. Further, a line 901 represents the transmission power of the TFCI for the DPCH from the Node B, which is changed as the UE is included in the soft handover zone 't'. This line represents a line for the case when the transmission power offset is not applied. In addition, an offset 932 represents a power offset generated based on the feedback information from the UE and the number and type of the Node Bs added to the active set of the UE, when the UE is located in the soft handover zone. The offset 932 is determined according to the number of the Node Bs in the active set at the time 't' (950), whether the Node B is controlled by the same RNC as the Node B transmitting the DSCH, and the difference between reception power levels of the DL-DCHs transmitted from the Node Bs to the UE. The offset 932 has a value between 1 dB and 3 dB.

An offset 933 represents a transmission power offset of the DL-DCH generated by the change in the channel environment between the UE and the Node B transmitting the DSCH at the time 't' (950). The offset 933 is calculated by analyzing a common pilot signal from the Node B transmitting the DSCH or separately analyzing a pilot field of the DL-DCH transmitted to the UE from the Node B transmitting the DSCH. The offset 933 chiefly depends on the distance between the Node B and the UE, and is in inverse proportion to the $4^{th}$ power of the distance. When the number of the Node Bs in the active set is '1', i.e., when the UE is located in the non-soft handover zone, the offset 933 is not required to be calculated according to the TPC transmitted by the UE. However, when the number of the Node Bs in the active set is two or more, the Node B transmitting the TFCI for the DSCH cannot use the TPC received from the UE in determining the transmission power of the TFCI for the DSCH. Therefore, the offset 933 is calculated by the value measured by the UE.

In FIG. 9, the proper transmission power of the TFCI for the DSCH required for the UE located in the soft handover zone is represented by the line 902, and the present invention aims at enabling the Node B transmitting the TFCI for the DSCH to transmit the DSCH to the UE according to the line 902. If the UE moves to the soft handoff zone without using the relative power offset value as in the prior art, a transmission power line of the TFCI for the DSCH transmitted from the Node B or the RNC to the UE becomes the line 901. The line 901 has a modified form of the line 902, the transmission power line of the TFCI for the DSCH or the TFCI for the DPCH for the case where the UE is located in the non-soft handover zone, by soft combining occurring because the UE is located in the soft handover zone.

In addition, the line 902 is a TFCI transmission power line for the DSCH determined considering the change in the channel environments between the UE and the Node Bs in the soft handover zone. In the case of the non-soft handover zone, the line 902 is used for determining transmission power of the TFCI for the DPCH and the TFCI for the DSCH.

In the embodiment of the present invention, the UE calculates information on a proper TFCI power offset for the DSCH or the above TFCI power offset for the DSCH and transmits the calculated information to the Node B or the RNC, so that the Node B or the RNC can use the line 902. If the proper TFCI power offset for the DSCH is transmitted from the UE to the Node B, the Node B can determine the transmission power of the TFCI for the DSCH even without being provided with the transmission power of the TFCI for the DSCH by the RNC. Therefore, the Node B can desirably transmit the TFCI for the DSCH by rapidly reflecting the variation in the channel environment between the UE currently receiving the DSCH and the Node B transmitting the DSCH. However, if the TFCI power offset information for the DSCH is transmitted to the Node B, the Node B sends the TFCI power offset information for the DSCH to the RNC to be provided with a proper TFCI transmission power value for the DSCH calculated by the RNC.

The offset 932 depends on a reception power level of the DL-DCH received at the UE from the Node Bs in the active set and the number and type of the Node Bs in the active set. The number of the Node Bs in the active set is a value recognized by the UE, and the type of the Node B is a value provided to the UE from the UTRAN or a value recognized by the UE. Further, the reception power level of the DL-DCH transmitted from each Node B in the active set can also be calculated by the UE.

The offset 932 is calculated by (i) determining the maximum value and the minimum value of a soft-combining gain determined according to the number of the Node Bs in the active set, (ii) calculating the reception power level of the DL-DCH received from each Node B in the active set, and (iii) calculating the offset value 932 considering the number of the Node Bs belonging to the same RNC as the Node B transmitting the DSCH among the Node Bs in the active set. As an example of calculating the offset value 932, if the UE receiving the DSCH is located in the soft handover zone, the number of active sets of the UE is 2 and one Node B out of the two Node Bs in the active set of the UE belongs to an RNC different from the RNC of the Node B transmitting the DSCH, then a range of the offset value 932 has the minimum value of 1 dB when a difference between the reception power levels of the signals received from the two Node Bs. The range of the offset value 932 has the maximum value of 3 dB when the reception power levels of the signals received from the two Node Bs are equal to each other. A value selected between the maximum value and the minimum value of the offset value 932 can be calculated considering a reception power level of the pilot field in the CPICH or DL-DPCH received at the UE receiving the DSCH from each Node B in the active set of the UE.

The offset 933 is determined depending upon the channel environment between the UE and the Node B transmitting the TFCI for the DSCH, and the channel environment refers to the distance between the UE and the Node B transmitting the TFCI for the DSCH and fading caused by multiple paths between them. There are several possible methods for determining the offset 933. A first method is to use a common pilot channel signal received by the UE. A second method is to use a pilot channel signal on the DL-DCH received by the UE. A third method is to use both the common pilot channel signal and the dedicated pilot signal on the DL-DCH, received by the UE.

In the first method, the UE measures a level of every common pilot signal received from the Node Bs in the active set on a frame unit basis, and then reports the measured signal level to the UTRAN. That is, the UTRAN determines a power offset of the TFCI for the DSCH by comparing the common pilot signals not only from the primary Node B transmitting the TFCI for the DSCH but also from the secondary Node B not transmitting the TFCI for the DSCH. A more detailed description will be made herein below.

The UE measures a level of the common pilot signal from the Node B transmitting the TFCI for the DSCH in a frame unit. As the result of the measurement, if the signal level increases, the UE decreases the offset value 933. However, if the signal level decreases, the UE increases the offset value 933. An initial value of the offset 933 can be determined based on the common pilot channel signal level measured when the UE first enters the soft handover zone. The initial value can be set to 0 dB. When the UE continuously stays in the soft handover zone, the offset value 933 is changed according to the variation in the common pilot channel signal level measured at every frame. As an example of calculating the offset value 933, if the currently measured signal level of the common pilot channel is different by 1 dB from the one-frame previously measured signal level of the common pilot channel, the offset 933 is determined to be 1 dB, 0.5 dB or other values.

The offset value depending on the change in the signal level of the common pilot channel can be differently determined according to topography of the soft handover zone, and the topography can be divided into the downtown, the midtown and the suburb. For example, in determining the offset 933 based on the distance between the UE and the Node B transmitting the TFCI for the DSCH, the common pilot channel signal level is in inverse proportion to the $4^{th}$ or $5^{th}$ power of the distance in the downtown, the $3^{rd}$ power of the distance in the midtown, and the square of the distance in the suburb.

In order to increase accuracy of the first method for determining the offset 933, the UE can measure the signal level of the common pilot channel from another Node B in the active set and use the measured value in determining the offset 933. A difference between the two measured common pilot channel signals is defined as a difference between the signal level of the common pilot channel from the primary Node B transmitting the TFCI for the DSCH and the signal level of the common pilot channel from the Node B having the highest common pilot channel signal level among secondary Node Bs, except for the primary Node B. A method for determining the offset 933 using the difference between the common pilot channel signal levels is illustrated in Table 4.

TABLE 4

| Variation in CPICH Signal Level Difference | Variation in Level of CPICH Signal from Primary Node B | Offset Based on Variation in Channel Environment between UE and Primary Node B |
|---|---|---|
| + | Varied | Offset Increased Higher than Previous Offset is Used. |
|  | Not Varied | The Same Offset as Previous Offset is Used. |
| − | Varied | Offset Decreased Lower than Previous Offset is Used. |
|  | Not Varied | The Same Offset as Previous Offset is Used. |

Table 4 illustrates a method for determining an offset using the level difference between the common pilot channel (CPICH) signals. In Table 4, that the common pilot channel signal difference is increased to be higher than the common pilot channel signal difference measured in the previous frame means that the distance between the UE and the Node B transmitting the TFCI for the DSCH is increased or the level of the common pilot channel signal from another Node B in the active set, measured by the UE, is changed. Therefore, if the signal level of the common pilot channel from the Node B transmitting the TFCI for the DSCH is decreased, the UE uses an offset increased to be higher than the offset 933 applied in the previous frame. However, if the signal level of the common pilot channel from the Node B transmitting the TFCI for the DSCH is not varied, it means that the common pilot channel signal from the Node B not transmitting the TFCI for the DSCH is changed. Since the variation in the common pilot channel signal from the Node B not transmitting the TFCI for the DSCH is irrelevant to setting of the transmission power of the TFCI for the DSCH, the offset value 933 applied to the previous frame is used as it is.

In the method of using the difference between the signal levels of the two common pilot channels, an initial value of the offset 933 can be set to the value measured by the UE when the UE first enters the soft handover zone. In this case, the initial value can be 0 dB.

The second method for determining the offset 933 is to use the level of the power signal on the DL-DCH received at the UE.

The method of using the common pilot channel signal, the first method for determining the offset 933, cannot properly reflect the variation in the channel environment when the measurement period is one frame thus causing a frequent change in the channel environment. When it is necessary to rapidly reflect the variation in the channel environment and an update period of the SSDT code is short, the method of measuring the signal level of the dedicated pilot channel in the DL-DCH is identical to the first method for determining the offset 933. That is, if the signal level of the pilot channel in the DL-DCH from the Node B transmitting the TFCI for the DSCH is increased, an offset smaller than the offset 933 applied to the previous frame is used. In contrast, if the signal level of the pilot channel in the DL-DCH is decreased, an offset larger than the offset 933 applied to the previous frame is used. Even the second method of determining the offset 933 can use the signal level of the pilot channel in the DL-DCH received from another Node B in the active set in order to increase the accuracy, and its principle is identical to that of the first method.

The first method for determining the offset 933 is utilized when the variation in the channel environment is insignificant or the update period of the SSDT code is relatively long. The second method for determining the offset 933 is utilized when the variation in the channel environment is significant or the update period of the SSDT code is relatively short. Therefore, it is possible to use the third method by gathering the advantages of the first and second methods. An example of the third method for determining the offset 933 will be described below. It will be assumed herein that the SSDT code has a length of 10 bits, the D field of the FBI field has a length of 2 bits, and an update period of a relative power offset is 5 slots.

In the third method, the UE measures a signal level of the pilot channel of the DL-DCH every slot over 5 slots, calculates the offset 933 by applying a weight to the measured signal level from the last measured value, calculates a relative power offset to be applied to the TFCI for the DSCH, and transmits the calculated relative power offset to the Node B transmitting the DSCH over the next 5 slots. When transmitting the relative power offset a third time after transmitting the relative power offset twice, the UE determines the relative power offset using the offset 933 determined based on the common pilot signal level and transmits the determined relative power offset to the Node B transmitting the DSCH. This is to correct the relative power offset considering the case when the actual channel environment can not be properly reflected because the number of the pilot bits transmitted over the DL-DCH is less than the number of the bits of the common pilot channel. In this case, a period of correcting the power offset using the common pilot channel can be changed to a period previously agreed by the upper layers of the UE and the Node B.

The actual offset value transmitted by the UE to the Node B transmitting the DSCH so as to determine the transmission power offset of the TFCI for the DSCH, is the sum of the offset value 932 determined based on the feedback information from the UE receiving the DSCH and the number and type of the Node Bs in the active set of the UE, and the offset 933 determined according to the variation in the channel environment between the UE and the Node B transmitting the TFCI for the DSCH. If the sum of the offset 932 and the offset 933 is defined as a TFCI transmission power offset for the DSCH transmitted by the UE to set the transmission power of the TFCI for the DSCH, the TFCI transmission power offset for the DSCH can be set as shown in Table 5.

TABLE 5

| TFCI Tx Power Offset for DSCH | Short Code |
|---|---|
| 0.5 dB | 00000 |
| 1 dB | 01001 |
| 1.5 dB | 11011 |
| 2 dB | 10010 |
| 2.5 dB | 00111 |
| 3 dB | 01110 |
| 3.5 dB | 11100 |
| 4 dB | 10101 |

The codes used in Table 5 are identical to the short codes used for the 1-bit FBI among the SSDT ID codes. In Table 5, the TFCI transmission power offset for the DSCH is determined considering an offset of 1 to 3 dB determined based on the feedback information from the UE receiving the DSCH and the type and number of the Node Bs in the active set of the UE and also considering the variation in the channel environment. The values in Table 5 are an example of the TFCI transmission power offsets for the DSCH determined according to the present invention. Among the 8 offset values in Table 5, the TFCI transmission power offset for the DSCH to be transmitted to the Node B transmitting the TFCI for the DSCH is determined by summing the offset 932 and the offset 933, rounding off the summed value, and then selecting the closest value. Upon receiving the TFCI transmission power offset for the DSCH, the Node B uses the received TFCI transmission power offset for the DSCH for an update period of the TFCI transmission power for the DSCH, or uses the received TFCI transmission power offset for the DSCH as an initial value in transmitting a first slot transmitting the TFCI for the DSCH. Thereafter, the Node B controls transmission power of the TFCI for the DSCH from the next slot using the TPC transmitted by the UE.

The method for transmitting the power offset value for determining the transmission power of the TFCI for the DSCH can use a separate coding method instead of the existing method using the SSDT code. The separate coding method is divided into tow methods: a first method using an (N,3) code and a second method using an (N,4) code.

A description will now be made of a coder and a decoder capable of simultaneously creating an (N,3) code and an (N,4) code according to an embodiment of the present invention. The (N,3) code and the (N,4) code can be applied to a relative power offset of the transmission power of the DSCH to be transmitted to the UE. If it is permissible that the number of the steps of the relative power offset is small, the (N,3) code is used. However, if the number of steps of the relative power offset must be large, the (N,4) code is used. There are several possible grounds (bases) for deciding a code to be used among the (N,3) code and the (N,4) code. As a example of the decision ground, if the UE receiving the DSCH is located in the soft handover zone, it is determined whether to use the (N,3) code or the (N,4) code according to the number of the Node Bs in the active set. The (N,3) code is used, when the number of the Node Bs in the active set is larger. The (N,4) code is used, when the number of the Node Bs in the active set is smaller.

Figure 10:
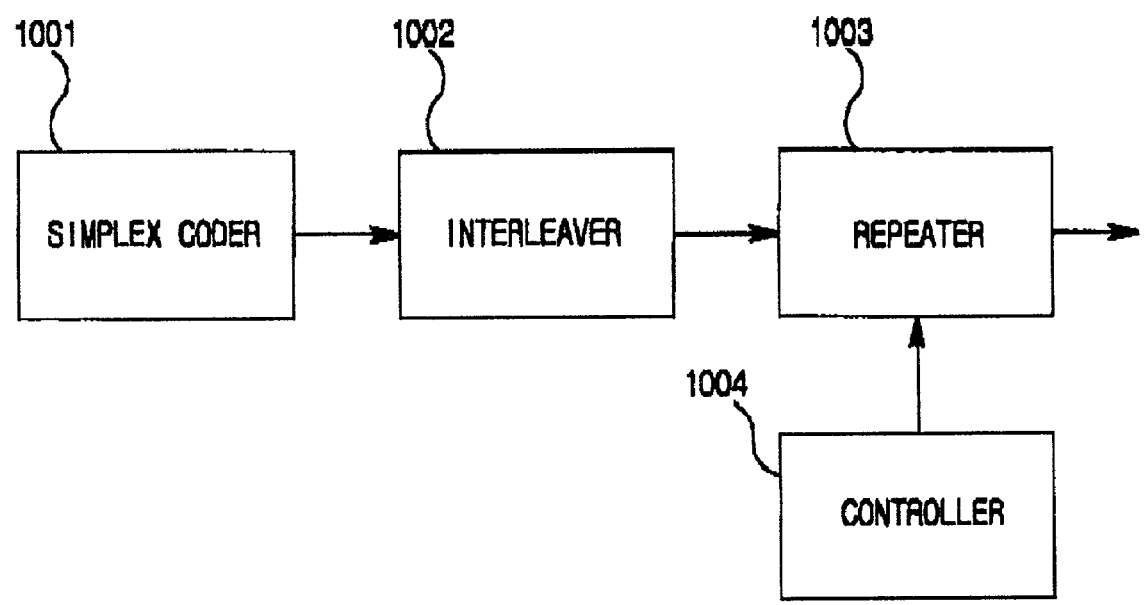
FIG. 10 illustrates a UE algorithm according to a first embodiment of the present invention.

FIG. 10 illustrates a UE algorithm according to a first embodiment of the present invention. Referring to FIG. 10, reference numeral 1001 represents a simplex coder. The simplex coder 1001 creates a simplex codeword by puncturing a first column from a first order Reed-Muller code. A simplex codeword created from a $(2^k-1,k)$ first order Reed-Muller code has a form of $(2^k-1,k)$. A (7,3) simplex codeword is required to create the (N,3) code, and a (15,4) simplex codeword is required to crate the (N,4) code. Illustrated in Table 6 are (8,3) first order Reed-Muller codes, and when first column is punctured, the (8,3) first order Reed-Muller codes become (7,3) simplex codewords.

TABLE 6

| W0 | 0 | 0 | 0 | 0 | 0 | 0 | 0 | 0 |
|----|---|---|---|---|---|---|---|---|
| W1 | 0 | 1 | 0 | 1 | 0 | 1 | 0 | 1 |
| W2 | 0 | 0 | 1 | 1 | 0 | 0 | 1 | 1 |
| W3 | 0 | 1 | 1 | 0 | 0 | 1 | 1 | 0 |
| W4 | 0 | 0 | 0 | 0 | 1 | 1 | 1 | 1 |
| W5 | 0 | 1 | 0 | 1 | 1 | 0 | 1 | 0 |
| W6 | 0 | 0 | 1 | 1 | 1 | 1 | 0 | 0 |
| W7 | 0 | 1 | 1 | 0 | 1 | 0 | 0 | 1 |

Illustrated in Table 7 are (16,4) first order Reed-Muller codes, and when first column is punctured, the (16,4) first order Reed-Muller codes become (15,4) simplex codewords.

TABLE 7

| W0 | 0 | 0 | 0 | 0 | 0 | 0 | 0 | 0 | 0 | 0 | 0 | 0 | 0 | 0 | 0 | 0 |
|----|---|---|---|---|---|---|---|---|---|---|---|---|---|---|---|---|
| W1 | 0 | 1 | 0 | 1 | 0 | 1 | 0 | 1 | 0 | 1 | 0 | 1 | 0 | 1 | 0 | 1 |
| W2 | 0 | 0 | 1 | 1 | 0 | 0 | 1 | 1 | 0 | 0 | 1 | 1 | 0 | 0 | 1 | 1 |
| W3 | 0 | 1 | 1 | 0 | 0 | 1 | 1 | 0 | 0 | 1 | 1 | 0 | 0 | 1 | 1 | 0 |
| W4 | 0 | 0 | 0 | 0 | 1 | 1 | 1 | 1 | 0 | 0 | 0 | 0 | 1 | 1 | 1 | 1 |
| W5 | 0 | 1 | 0 | 1 | 1 | 0 | 1 | 0 | 0 | 1 | 0 | 1 | 1 | 0 | 1 | 0 |
| W6 | 0 | 0 | 1 | 1 | 1 | 1 | 0 | 0 | 0 | 1 | 1 | 1 | 1 | 0 | 0 | 0 |
| W7 | 0 | 1 | 1 | 0 | 1 | 0 | 0 | 1 | 1 | 1 | 0 | 1 | 0 | 0 | 0 | 1 |
| W8 | 0 | 0 | 0 | 0 | 0 | 0 | 0 | 0 | 1 | 1 | 1 | 1 | 1 | 1 | 1 | 1 |
| W9 | 0 | 1 | 0 | 1 | 0 | 1 | 0 | 1 | 1 | 0 | 1 | 0 | 1 | 0 | 1 | 0 |
| W10 | 0 | 0 | 1 | 1 | 0 | 0 | 1 | 1 | 1 | 1 | 0 | 0 | 1 | 1 | 0 | 0 |
| W11 | 0 | 1 | 1 | 0 | 0 | 1 | 1 | 0 | 1 | 0 | 0 | 1 | 1 | 0 | 0 | 1 |
| W12 | 0 | 0 | 0 | 0 | 1 | 1 | 1 | 1 | 1 | 1 | 1 | 1 | 0 | 0 | 0 | 0 |
| W13 | 0 | 1 | 0 | 1 | 1 | 0 | 1 | 0 | 1 | 0 | 1 | 0 | 0 | 1 | 0 | 1 |
| W14 | 0 | 0 | 1 | 1 | 1 | 1 | 0 | 0 | 1 | 1 | 0 | 0 | 0 | 0 | 1 | 1 |
| W15 | 0 | 1 | 1 | 0 | 1 | 0 | 0 | 1 | 1 | 0 | 0 | 1 | 0 | 1 | 1 | 0 |

Figure 11:
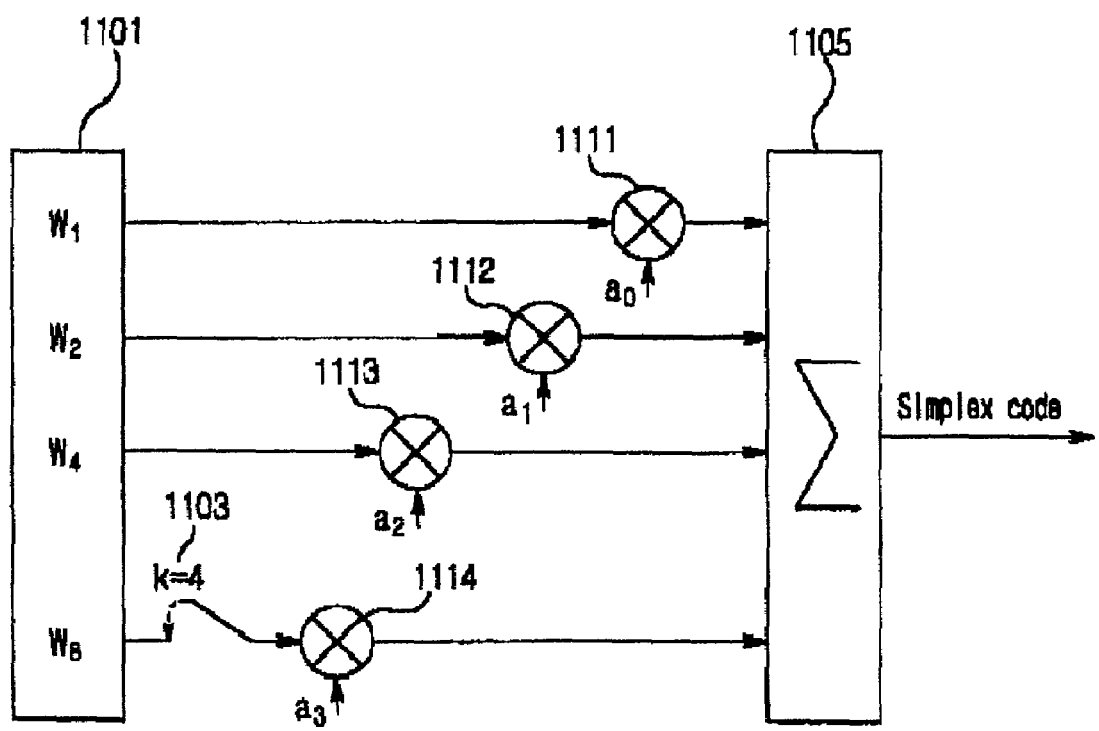
FIG. 11 illustrates a coder for creating simplex codewords by puncturing the first order Reed-Muller codes.

FIG. 11 illustrates a coder for creating simplex codewords by puncturing the first order Reed-Muller codes shown in Table 6 and Table 7. The coding algorithm, illustrated in FIG. 11, for creating the simplex codewords can also be replaced with a memory for storing the simplex codewords shown in Table 6 and Table 7.

Referring to FIG. 11, reference numeral 1101 indicates a first order Reed-Muller code generator for generating the first order Reed-Muller codes W1, W2, W4 and W8. The W1, W2, W4 and W8 are first order Reed-Muller basis codes, and used for creating the first order Reed-Muller basis codes W0, W1, . . . , W15. The leftmost coded bits '0' of the W1, W2, W4 and W8 are punctured. The punctured first order Reed-Muller codes are used to create the simplex codes. The basis code W8 is additionally used for the (N,4) code. Multipliers 1111, 1112, 1113 and 1114 perform an operation of selecting punctured first order Reed-Muller basis codes required to create punctured Wj (j=0, 1, . . . , 15) codes by multiplying input information bits by the punctured (N,4) code. For example, if the input information bits a3, a2, a1 and a0 are '1101', the first order Reed-Muller code generator selects the punctured first order Reed-Muller basis codes W8 and W1, thus creating a code W13 corresponding to the decimal number 13 represented by the input information bits.

A switch 1103 is turned on when creating a simplex code for creating the (N,4) code, and turned off when creating a simplex code for creating the (N,3) code. A summer 1105 creates a first order Reed-Muller code corresponding to the input information bits by summing up the first order Reed-Muller basis codes selected by the input information bits.

The simplex code output from the simplex coder 1001 is provided to an interleaver 1002. The interleaver 1002 column-permutates the received simplex code according to a specific pattern. The column-permutated simplex code has a specific pattern such that N coded symbols, although they are repeated, become a code having an optimal performance for a length N. A column permutation pattern used by the interleaver 1002 to create the (N,3) code is represented by $$[S1, S2, S3, S4, S5, S6, S7] \rightarrow [S1, S2, S4, S7, S3, S5, S6] \quad \text{Equation (2)}$$

The column permutation is performed to permutate the received simplex codes according to weight distribution. In the column permutation, $S_j (j=0, 1, \ldots, 7)$ denotes a $j^{th}$ symbol of the (7,3) simplex code. The simplex code column-permutated according to the above pattern is repeated so that the simplex code, although it is divided to have a length N, becomes a code having an optimal performance for the length N. A column permutation pattern used by the interleaver 1002 to create the (N,4) code is represented by $$[S1, S2, S3, S4, S5, S6, S7, S8, S9, S10, S11, S12, S13, S14, S15] \rightarrow [S1, S2, S4, S8, S14, S13, S11, S7, S5, S3, S12, S10, S15, S9, S6] \quad \text{Equation (3)}$$

The column permutation is performed to create the (N,4) code having optimal performance for a length N except for the case when the value N is 5, 20, 35, 50, ..., i.e., N mod 15=5. When N mod 15=5, an (N,4) code whose minimum distance is different by 1 from the optimal code is created.

The column-permutated (7,3) simplex code or (15,4) simplex code, output from the interleaver 1002, is provided to a repeater 1003. The repeater 1003 repeats the column-permutated (7,3) simplex code or (15,4) simplex code under the control of a controller 1004. The controller 1004 controls the repeater 1003 to output N simplex codes by repeating the input simplex code according to the N value.

For better understanding of an operation of the repeater 1003 and the controller 1004, a process for creating a (15,3) code with the column-permutated (7,3) simplex code will be described. The repeater 1003 repeats the column-permutated (7,3) simplex code in order of S1, S2, S4, S7, S3, S5, S6, S1, S2, S4, S7, S3, S5, S6 ..., and the controller 1004 controls the repeater 1003 to output only S1, S2, S4, S7, S3, S5, S6, S1, S2, S4, S7, S3, S5, S6, S1 according to the value N=15.

Figure 12:
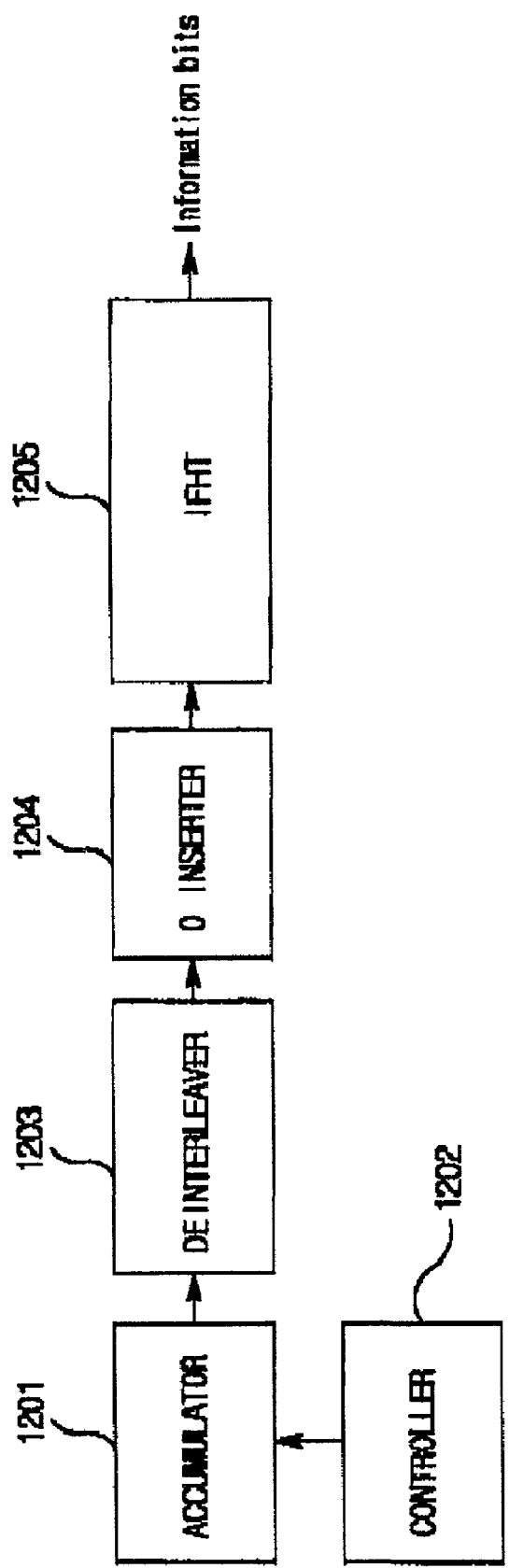
FIG. 12 illustrates a structure of a decoder corresponding to the coder of FIG. 10 for creating the (N,3) code and the (N,4) code.

FIG. 12 illustrates a structure of a decoder corresponding to the coder of FIG. 10 for creating the (N,3) code and the (N,4) code. Referring to FIG. 12, the (N,3) code or the (N,4) code output from the repeater 1003 of FIG. 10 is provided to an accumulator 1201, an initial stage of the decoder. The accumulator 1201 is controlled by a controller 1202. The controller 1202 determines whether the code used in the coder is the (N,3) code or the (N,4) code. If the (N,3) code is used, the controller 1202 controls the accumulator 1201 to divide symbols of the received (N,3) code in a unit of 7 symbols so that the repeated symbols are repeatedly accumulated by the accumulator 1201. If the (N,4) code is used, the controller 1202 controls the accumulator 1201 to divide symbols of the received (N,4) code in a unit of 15 symbols so that N symbols are repeatedly accumulated by the accumulator 1201. The (N,3) code or the (N,4) code accumulated by the accumulator 1201 is converted to the (7,3) simplex code or the (15,4) simplex code. The (7,3) simplex code or the (15,4) simplex code output from the accumulator 1201 is provided to a deinterleaver 1203. The deinterleaver 1203 converts the received (7,3) simplex code or (15,4) simplex code to the original simplex code by performing an inverse operation of the column permutation performed by the interleaver 1002 of FIG. 10. An inverse column permutation pattern for the (7,3) code is represented by $$[S1, S2, S4, S7, S3, S5, S6] \rightarrow [S1, S2, S3, S4, S5, S6, S7] \quad \text{Equation (4)}$$

An inverse column permutation pattern for the (15,4) code is represented by $$[S1, S2, S4, S8, S14, S13, S11, S7, S5, S3, S12, S10, S15, S9, S6] \rightarrow [S1, S2, S3, S4, S5, S6, S7, S8, S9, S10, S11, S12, S13, S14, S15] \quad \text{Equation (5)}$$

After being subject to inverse column permutation by the deinterleaver 1203, the (7,3) simplex code or (15,4) simplex code is provided to a zero (0) inserter 1204. The zero inserter 1204 converts the (7,3) simplex code to a (8,3) first order Reed-Muller code by inserting a 0-sybmol before the leftmost symbol of the received (7,3) simplex code, and converts the (15,4) simplex code to a (16,4) first order Reed-Muller code by inserting a 0-sybmol before the leftmost symbol of the received (15,4) simplex code.

An inverse fast Hadamard transform part (IFHT) 1205 decodes the (8,3) first order Reed-Muller code or the (16,4) first order Reed-Muller code to the original information bits provided to the simplex coder 1001 of FIG. 10, by performing inverse fast Hadamard transform on the received (8,3) first order Reed-Muller code or (16,4) first order Reed-Muller code. The IFHT 1205 can rapidly decode the first order Reed-Muller code and decrease complexity of a hardware structure for decoding the first order Reed-Muller code.

In the method for transmitting information on the transmission power of the TFCI for the DSCH, if the UE transmitting information on the transmission power of the TFCI for the DSCH determines a transmission power offset of the TFCI for the DSCH in person, the information on the transmission power of the TFCI for the DSCH can be the transmission power offset of the TFCI for the DSCH. If the transmission power of the TFCI for the DSCH is determined by the RNC, the information on the transmission power of the TFCI for the DSCH transmitted by the UE can be information for determining the transmission power offset of the TFCI for the DSCH.

Reference will be made again to the first and second methods for determining the transmission power of the TFCI for the DSCH.

In the first method, the UTRAN (particularly RNC) determines transmission power of the TFCI for the DSCH considering the feedback information transmitted from the UE and the number and type of the Node Bs in the active set of the UE, recognized by the RNC. In the second method, the UE determines the TFCI transmission power offset for the DSCH using the number and type of the Node Bs in the active set of the UE and the information measured by the UE, e.g., information on the levels of the common pilot signals from the Node Bs in the active set, and transmits the determined power offset information to the Node B or the RNC, so that the Node B and the RNC determines the transmission power of the TFCI for the DSCH based on the received power offset information.

In addition to the first and second method for determining the transmission power of the TFCI for the DSCH, there is a third possible method. In the third method for determining the transmission power of the TFCI for the DSCH, the UTRAN (particularly RNC) determines the transmission power of the TFCI for the DSCH using a value recognized by the UTRAN itself, rather than using the feedback information from the UE. The information used by the RNC in determining the transmission power of the TFCI for the DSCH includes (i) the number and type of the Node Bs in the active set of the UE receiving the DSCH, (ii) the number and type of the Node Bs in the active set, periodically reported by the UE over the UL-DPDCH, and (iii) the levels of the common pilot signals from the Node Bs in the active set, periodically reported by the UE over the UL-DPDCH. The third method is advantageous in that since the UTRAN is not required to receive the feedback information from the UE over the UL-DPCCH, the UE is not required to calculate the information, i.e., an offset value, for the transmission power of the TFCI for the DSCH, thus contributing to a reduction in complexity of the UE hardware. However, since the UTRAN depends on the information periodically reported by the UE over the UL-DPDCH instead of using the feedback information from the UE, the UTRAN cannot rapidly reflect the variation in signal transmission environment between the UE receiving the DSCH and the Node B transmitting the DSCH. This is because unlike the control commands such as TPC, TFCI and FBI, transmitted by the UE over the UL-DPCCH, the signaling information transmitted by the UE over the UL-DPDCH has a long processing time.

Figure 13:
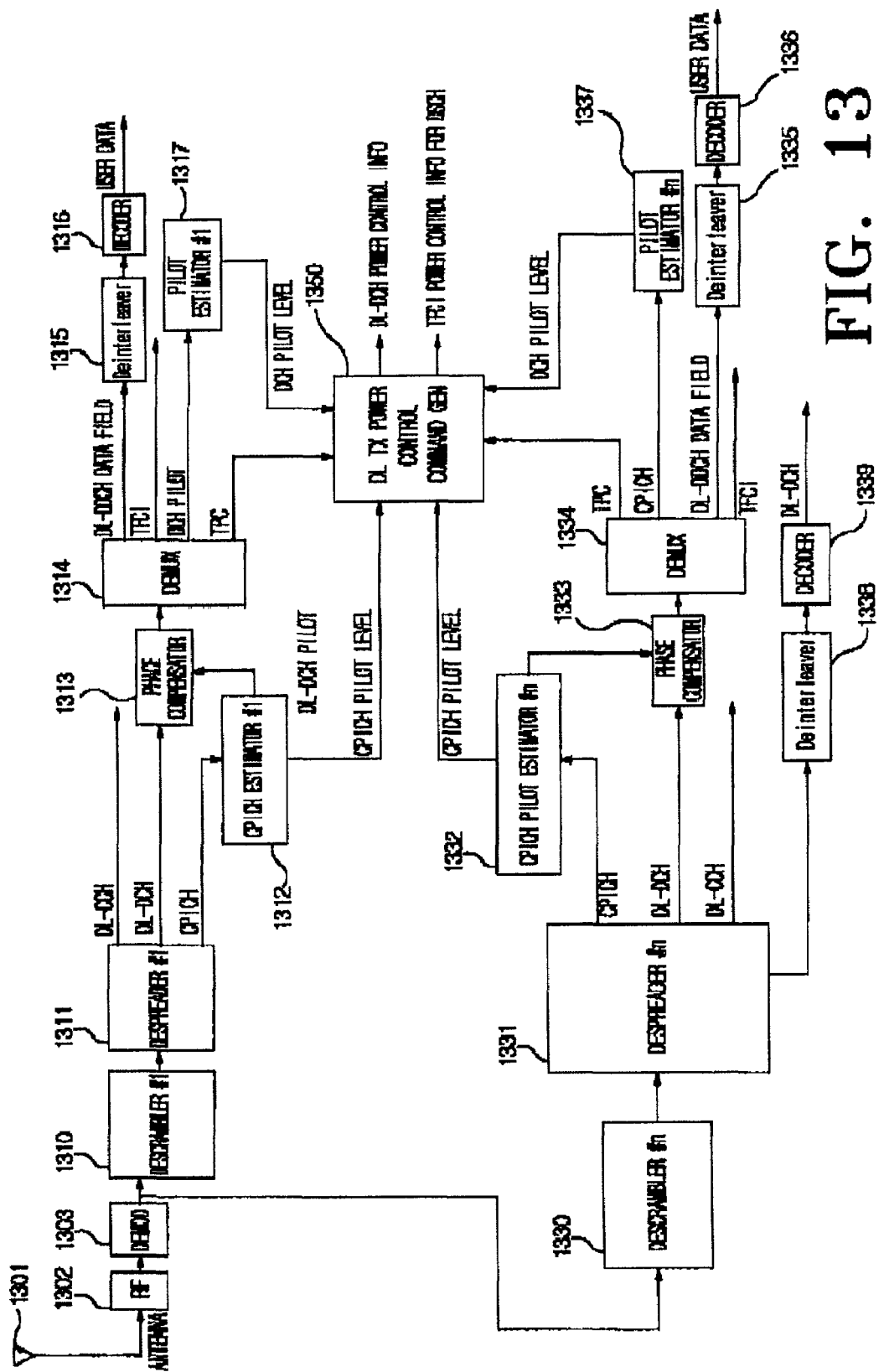
FIG. 13 illustrates a structure of a UE receiver supporting a multi-path reception function according to an embodiment of the present invention.

FIG. 13 illustrates a structure of a UE receiver supporting a multi-path reception function according to an embodiment of the present invention. The "multi-path" refers to the paths through which the UE, when located in the non-soft handover zone, receives the signal transmitted from the Node B directly and indirectly after being reflected by an obstacle, and also refers to the paths through which the UE, when located in the soft handover zone, receives the signals transmitted from the Node Bs in the active set.

Referring to FIG. 13, an RF (Radio Frequency) module 1302 receives RF signals transmitted from each Node B in the active set of the UE through an antenna 1301, and converts the RF signals carried by a carrier to baseband or intermediate frequency (IF) band signals. The output of the RF module 1302 is demodulated by a demodulator 1303, and then descrambled by a descrambler#1 1310 to a descrambler#n 1330. The number of the descramblers is determined according to the number of downlink scrambling codes that the UE can descramble at the same time, and this value can be different according to the maker. The "downlink scrambling codes" refer to the codes used to identify the Node Bs in the W-CDMA system. For convenience sake, it will be assumed in FIG. 13 that the descrambler#1 1310 is used to descramble a signal from a Node B#1 not transmitting the DSCH in the active set, and the descrambler#n 1330 is used to descramble a signal from a Node B#n transmitting the DSCH.

The output of the descrambler#1 1310 is provided to a despreader#1 1311, and then multiplied by a Walsh code corresponding to a Walsh code multiplied by the downlink channel in a Node B transmitter, thereby to identify the downlink channel. In the W-CDMA system, the Walsh code used to identify the channel is called an "OVSF (Orthogonal Variable Spreading Factor) code", the length of which is determined according to a data rate of the channel. The output of the despreader#1 1311 includes a downlink common channel (DL-CCH) signal, a downlink dedicated channel (DL-DCH) signal and a downlink common pilot channel (DL-CPICH) signal. The "downlink common channel signal" includes a broadcasting channel (BCH) for transmitting system information of the Node B, and a paging channel (PCH) or a forward access channel (FACH) for transmitting signaling information to the UE. Further, the "downlink dedicated channel" refers to a dedicated channel for transmitting information on a variation in the channel environment between the Node B#1 and the UE to the UE.

The common pilot channel output from the despreader#1 1311 is provided to a common pilot channel estimator#1 1312. The common pilot channel estimator#1 1312 estimates a phase variation of the received signal and a level of the common pilot signal according to the variation in the channel environment between the Node B#1 and the UE. The phase of the signal transmitted from the Node B#1, estimated by the common pilot channel estimator 1312, is provided to a phase compensator 1313, which compensates the phase of the downlink dedicated channel received at the UE from the Node B#1. A level of the common pilot channel signal estimated by the phase compensator 1313 is provided to a downlink transmission power control command generator 1350, which generates downlink transmission power control command information or downlink channel information based on the provided information.

A demultiplexer 1314 demultiplexes the phase-compensated downlink dedicated channel signal output from the phase compensator 1313 into a downlink dedicated physical data channel (DL-DPDCH) and a downlink dedicated physical control channel (DL-DPCCH) on a time division basis. The output of the demultiplexer 1314 includes downlink dedicated channel data field, TFCI, dedicated channel pilot and TPC. The downlink dedicated channel data is deinterleaved by a deinterleaver 1315, and then provided to a decoder 1316. The decoder 1316 decodes the deinterleaved data into its original data and transmits the decoded data to an upper layer. The TFCI output from the demultiplexer 1314 is received for one frame and then added to a codeword transmitted for one frame. The added data is used to analyze transport channels having different data rates, transmitted over the DL-DPDCH. The dedicated channel pilot output from the demultiplexer 1314 is provided to a dedicated channel pilot estimator#1 1317, which measures a signal level of the received dedicated channel pilot. The estimated signal level of the dedicated channel pilot, output from the dedicated channel pilot estimator#1 1317, is provided to the downlink transmission power control command generator 1350, which generates downlink transmission power control command information or downlink channel information based on the provided information. The TPC output from the demultiplexer 1314 is an uplink power control command transmitted by the Node B#1 to control uplink signal power of the UE. The TPC is used as an uplink transmission power control command transmitted by the UE, and at the same time, provided to the downlink transmission power control command generator 1350, which generates the downlink transmission power control command information based on the received TPC.

The descrambler#n 1330 descrambles the downlink signal transmitted from the Node B#n in the same manner as the descrambler#1 1310. The output of the descrambler#n 1330 is provided to a despreader#n 1331, and then descrambled into a common pilot channel (CPICH) signal, a downlink dedicated channel (DL-DCH) signal, a downlink common channel (DL-CCH) signal, and a downlink shared channel (DSCH) signal. The despreader#n 1331 has the same operating principle as the despreader#n 1 1311. The common pilot channel output from the despreader#n 1331 is provided to a common pilot channel estimator#n 1332, which outputs a phase variation based on the channel environment between the UE and the Node B#n to a phase compensator 1333. Further, the signal level of the common pilot channel output from the common pilot channel estimator#n 1332 is provided to the downlink transmission power control command generator 1350, which creates downlink transmission power control command information or downlink channel information based on the received signal level. The common pilot channel estimator#n 1332 has the same operating principle as the common pilot channel estimator#1 1312. The downlink dedicated channel signal output from the despreader#n 1331 is separated into TPC, dedicated channel pilot, downlink dedicated channel data field and TFCI, through the phase compensator 1333 and a demultiplexer 1334.

The phase compensator 1333 has the same operating principle as the phase compensator 1313. The demultiplexer 1334 also has the same operating principle as the demultiplexer 1314. The downlink dedicated data field is deinterleaved by a deinterleaver 1335, and then provided to a decoder 1336. The decoder 1336 decodes the deinterleaved data into its original data and transmits the decoded data to the upper layer. The TFCI output from the demultiplexer 1334 is received for one frame and then added to a codeword transmitted for one frame. The added data is used to analyze transport channels having different data rates, transmitted over the DL-DPDCH. The dedicated channel pilot output from the demultiplexer 1334 is provided to a dedicated channel pilot estimator#n 1337, which measures a signal level of the received dedicated channel pilot. The dedicated channel pilot estimator#n 1337 has the same operating principle as the dedicated channel pilot estimator#1 1317. The estimated signal level of the dedicated channel pilot, output from the dedicated channel pilot estimator#n 1337, is provided to the downlink transmission power control command generator 1350, which generates downlink transmission power control command information or downlink channel information based on the provided information.

The TPC output from the demultiplexer 1334 is an uplink power control command transmitted by the Node B#1 to control uplink signal power of the UE. The TPC is used as an uplink transmission power control command transmitted by the UE, and at the same time, provided to the downlink transmission power control command generator 1350, which generates the downlink transmission power control command information based on the received TPC. The downlink common channel signal output from the despreader#n 1331 includes a broadcasting channel and a forward access channel. The broadcasting channel transmits system information and the forward access channel transmits signaling information transmitted from an upper layer of the Node B or an upper layer of the mobile communication network to the UE. The downlink shared channel output from the despreader#n 1331 is interleaved by a deinterleaver 1338, and then provided to a decoder 1339. The decoder 1339 decodes the deinterleaved data and transmits the decoded data to an upper layer of the UE. The downlink shared channel is a channel for transmitting only the user data. The deinterleaver 1338 has the same operation as the deinterleaver 1315 and the deinterleaver 1335. The decoder 1339 also has the same operation as the decoders 1316 and 1336.

If the UE receives signals not only from the current Node B but also from a new Node B as it arrives at the soft handover zone, the downlink transmission power control command generator 1350 receives TPC, dedicated channel pilot signal level and common pilot signal level transmitted from the Node B#1, and also receives TPC, dedicated channel pilot signal level and common pilot signal level transmitted from the Node B#2. Further, the downlink transmission power control command generator 1350 creates transmission power control information of the DL-DPCCH, transmission power control information of the TFCI for the DSCH associated with the DL-DPCCH, and downlink channel information of the DSCH.

More specifically, to create the power control information of the DL-DCH, the downlink transmission power control command generator 1350 sums up a level of the dedicated channel pilot signal received from the Node B#1 and a level of the dedicated channel pilot signal received from the Node B#n, determines whether the added value is equal to a downlink dedicated channel signal level desired by the UE. If the sum of the dedicated channel pilot signal levels is lower than the downlink dedicated channel signal level desired by the UE, the downlink transmission power control command generator 1350 creates downlink dedicated channel power control information corresponding to an increment of the downlink transmission power. Otherwise, the downlink transmission power control command generator 1350 creates downlink dedicated channel power control information corresponding to a decrement of the downlink transmission power. The downlink transmission power control command generator 1350 creates transmission power control information of the TFCI for the DSCH, and the DSCH power control information can be divided into two types as follows.

First, the downlink transmission power control command generator 1350 personally determines transmission power of the TFCI for the DSCH and then transmits transmission power offset information of the TFCI for the DSCH through an FBI field of the UL-DPCCH. A ground (basis) for determining the TFCI transmission power offset information includes (i) a signal level of the common pilot channel, (ii) a signal difference between the common pilot channels, (iii) a signal level of the dedicated pilot channel, (iv) a signal difference between dedicated pilot channels, all used in the method for determining the offset 933 of FIG. 9, and (v) the number and type of Node Bs in the active set of the UE determining the offset 932. The transmission power offset information of the TFCI for the DSCH can be transmitted over several slots, and is subject to separate coding in order to prevent occurrence of an error in the data. In this case, the coded transmission power offset can be transmitted using the existing SSDT ID code or other codes such as the (N,3) code or the (N,4) code proposed in the invention. Second, the downlink channel information of the DSCH is used by the UTRAN to determine a power offset to be applied to the TFCI for the DSCH, when a power offset value to be applied to the TFCI for the DSCH to be transmitted by the Node B transmitting the TFCI for the DSCH in the soft handover zone is determined by the UTRAN, not the UE.

Figure 14:
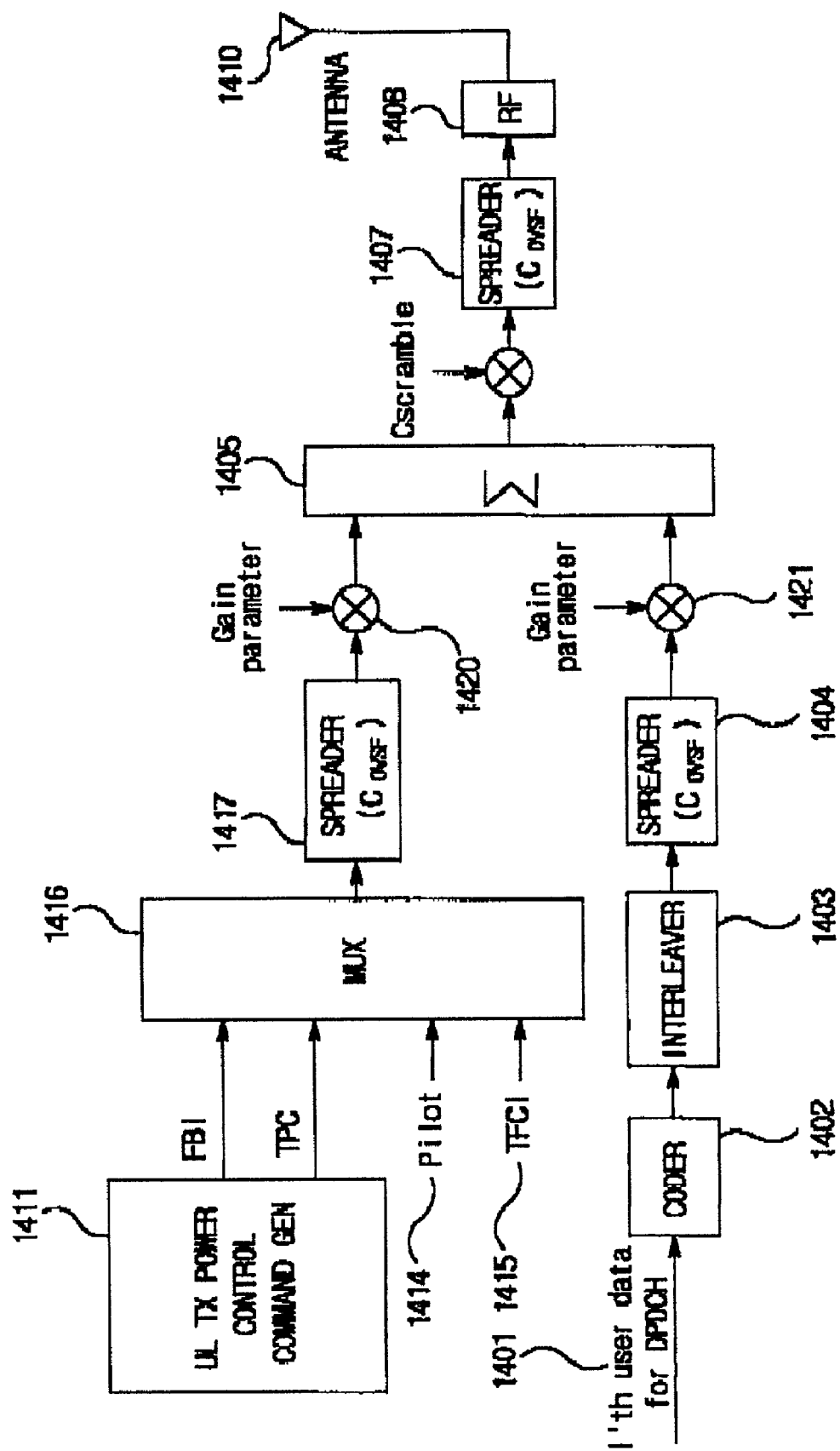
FIG. 14 illustrates a structure of a UE transmitter according to an embodiment of the present invention.

FIG. 14 illustrates a structure of a UE transmitter according to an embodiment of the present invention. Referring to FIG. 14, the power control information for the downlink dedicated channel (DL-DCH) and the power control information for the downlink shared channel (DSCH), output from the downlink transmission power control command generator 1350 of FIG. 13, are provided to an uplink transmission power control command generator 1411, and then converted to a downlink dedicated channel power control command and a codeword indicating TFCI transmission power offset information for the downlink shared channel or downlink channel information. The downlink dedicated channel power control command is broadcast transmitted to every Node B in the active set of the UE over the TPC field of the UL-DPCCH. An update period of the transmission power offset information of the TFCI for the downlink shared channel or the downlink channel information is determined by the length of the codeword or the upper layer, and the transmission power offset information of the TFCI for the DSCH or the downlink channel information is transmitted over several slots. The uplink transmission power control command generator 1411 outputs a codeword indicating the TFCI transmission power offset for the DSCH and the downlink channel information using the S field of the FBI field in the UL-DPCCH, and transmits the downlink dedicated channel power control command using the TPC field of the UL-DPCCH. A multiplexer 1416 multiplexes a value to be filled in an FBI field 1412 and a value to be filled in a TPC field 1413, both received from the uplink transmission power control command generator 1411, and a pilot 1414 and a TFCI 1415, both received from the upper layer, thus creating UL-DPCCH data. The UL-DPCCH data is provided to a spreader 1417, and then spread with an OVSF code for the UL-DPCCH. The output of the spreader 1417 is multiplied by a transmission power gain for controlling transmission power of the UL-DPCCH by a multiplier 1420, and then summed with the UL-DPDCH by a summer 1405.

User data 1401 for the UL-DPDCH is coded by a coder 1402, and then interleaved by an interleaver 1403. The output of the interleaver 1403 is spread with an OVSF code proper for a data rate of the UL-DPDCH by a spreader 1404. The output of the spreader 1404 is multiplied by a transmission power gain for controlling transmission power of the UL-DPDCH by a multiplier 1421, and then summed with the UL-DPCCH by the summer 1405. The sum of the UL-DPDCH and the UL-DPCCH, output from the summer 1405, is scrambled by a scrambler 1406 with a scrambling code used by the UE for the UL-DCH. The scrambled signal is modulated by a modulator 1407, and then multiplied by a carrier in an RF module 1408. The output of the RF module 1408 is broadcast transmitted to the Node B through an antenna 1410.

Figure 15:
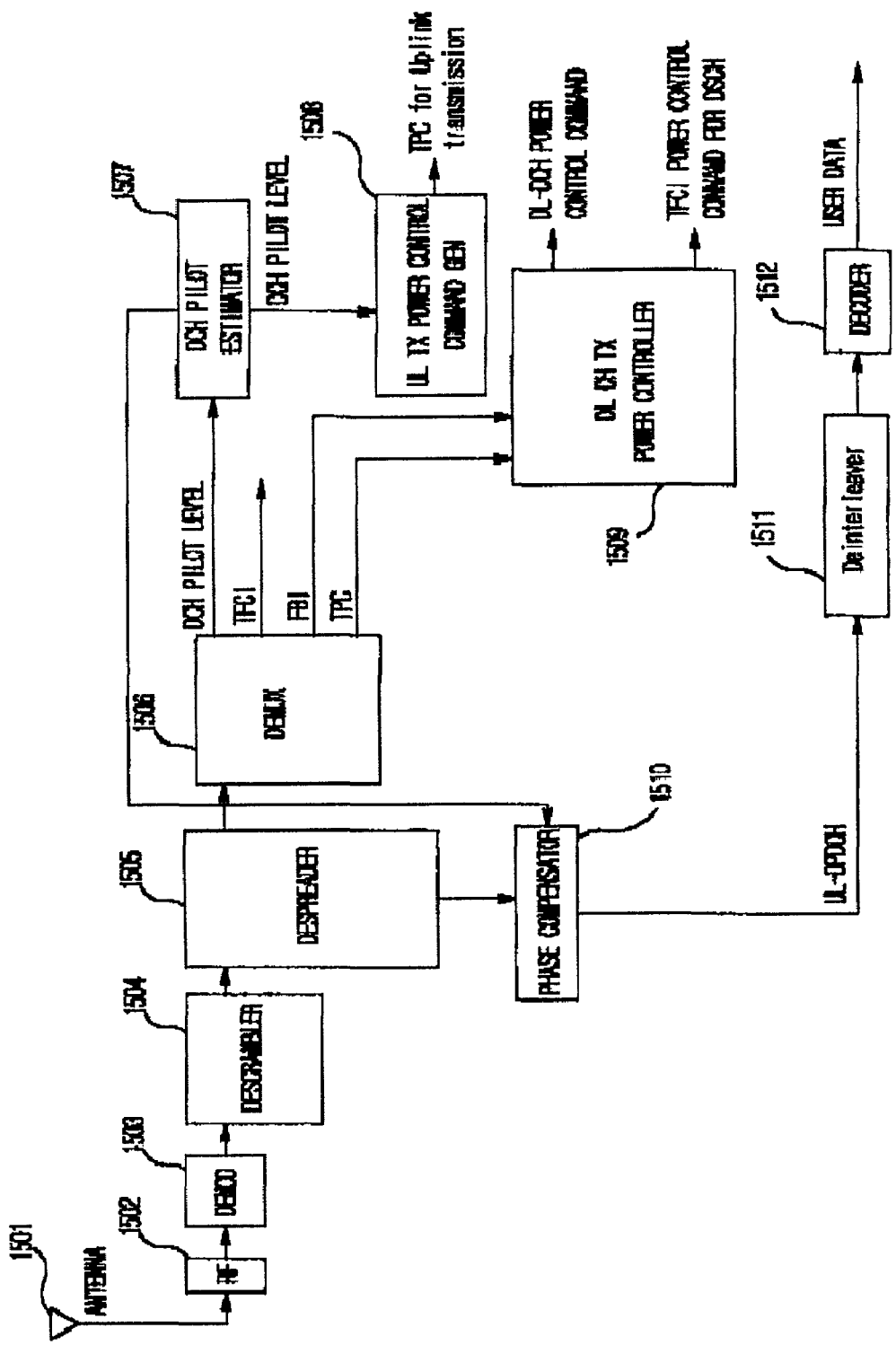
FIG. 15 illustrates a structure of a Node B receiver according to an embodiment of the present invention.

FIG. 15 illustrates a structure of a Node B receiver according to an embodiment of the present invention. Referring to FIG. 15, a signal received from the UE through an antenna 1501 is converted to an RF band or baseband signal by an RF module 1502. The output of the RF module 1502 is demodulated by a demodulator 1503, and then descrambled by a descrambler 1504. A scrambling code used for the descrambling is identical to the scrambling code used by the multiplier 1406 of FIG. 14. By using this scrambling code, the Node B can identify the signals from several UEs. The output signal of the descrambler 1504 is despread (separated) into UL-DPCCH and UL-DPDCH by a despreader 1505.

The UL-DPCCH output from the despreader 1505 is demultiplexed into pilot, TFCI, FBI and TPC by a demultiplexer 1506. The uplink dedicated channel pilot output from the demultiplexer 1506 is provided to a dedicated channel pilot estimator 1507, which estimates a phase variation of a signal based on a channel environment between the UE and the Node B, and a level of the received uplink dedicated channel pilot. The estimated phase variation value is provided to a phase compensator 1510, which compensates a phase of the UL-DPDCH output from the despreader 1505. That is, since the UL-DPDCH is received at the Node B through the same channel environment as the UL-DPCCH, it is possible to compensate for phase distortion of the UL-DPDCH caused by the variation in the channel environment between the UE and the Node B, by compensating the phase with the estimated phase variation value output from the dedicated channel pilot estimator 1507.

The dedicated channel pilot signal level output from the dedicated channel pilot estimator 1507 is provided to an uplink transmission power control command generator 1508, which creates TPC used by the Node B to control the uplink transmission power based on the received dedicated channel pilot signal level. The FBI output from the demultiplexer 1506 is provided to a downlink channel transmission power controller 1509, which creates a downlink dedicated channel power control command based on the received FBI. Further, the TPC output from the demultiplexer 1506 is provided to the downlink channel transmission power controller 1509, which creates a downlink shared channel power control command based on the received TPC.

The downlink channel transmission power controller 1509 creates a command for controlling transmission power of TFCI for the DSCH using the FBI information received from the demultiplexer 1506, and the FBI information can be transmission power offset information of the TFCI for the DSCH and downlink channel information. Since the transmission power offset information of the TFCI for the DSCH or the downlink channel information, transmitted from the Node B to the UE using the FBI information, is coded with an SSDT ID code, an (N,3) code, an (N,4) code or other codes, the relative power offset information or the downlink channel information transmitted over the FBI is subject to decoding in the downlink channel transmission power controller 1509. The downlink channel information is not used by the Node B, and instead, transmitted to the UTRAN so that the UTRAN determines a power offset to be used for the DSCH. Meanwhile, the uplink dedicated data channel signal output from the phase compensator 1510 is deinterleaved by a deinterleaver 1511. The output signal of the deinterleaver 1511 is decoded by a decoder 1512, and then transmitted to an upper layer of the Node B.

Figure 16:
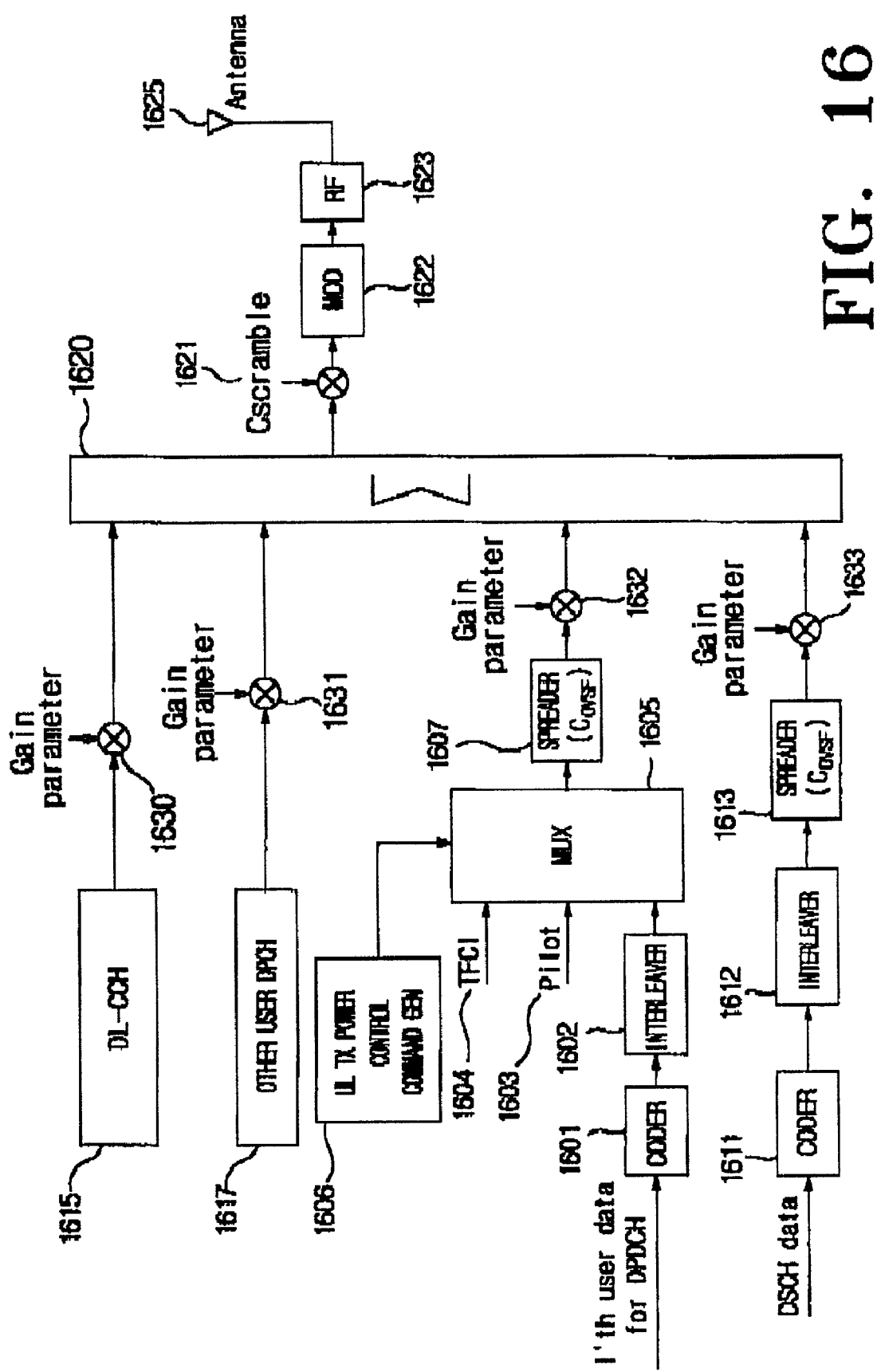
FIG. 16 illustrates a structure of a Node B transmitter according to an embodiment of the present invention.

FIG. 16 illustrates a structure of a Node B transmitter according to an embodiment of the present invention. Referring to FIG. 16, user data to be transmitted over the DL-DPDCH is coded by a coder 1601, and then interleaved by an interleaver 1602. The output signal of the interleaver 1602 is provided to a multiplexer 1605. The multiplexer 1605 multiplexes TFCI 1604, pilot 1603, TPC for controlling transmission power of the UL-DCH, output from an uplink transmission power control command generator 1606, and DL-DPDCH output from the interleaver 1602, thereby creating DL-DCH. The uplink transmission power control command generator 1606, the same device as the uplink transmission power control command generator 1508 of FIG. 15, sets the TPC using a signal level of the dedicated pilot channel of the UL-DPCCH and then transmits it over the DL-DPCCH of the DL-DCH. The DL-DCH output from the multiplexer 1605 is spread with an OVSF code for the DL-DCH by a spreader 1607, and then multiplied by a channel gain set to control transmission power of the DL-DCH by a multiplier 1632. The output of the multiplier 1632 is provided to a summer 1620. The channel gain set to control transmission power of the DL-DCH is set by the uplink dedicated channel power control command output from the uplink channel transmission power controller 1509 of FIG. 15, and the transmission power of the TFCI 1604 is determined to be the transmission power output from the uplink channel transmission power controller 1509 or the transmission power transmitted by the RNC, as shown in FIGS. 6B and 6C.

A coder 1611 codes DSCH data transmitted from the Node B to the UE. The coded DSCH data is interleaved by an interleaver 1612, and then spread with an OVSF code for the DSCH by a spreader 1613. The spread signal output from the spreader 1613 is multiplied by a channel gain for controlling transmission power of the DSCH by a multiplier 1633, and then provided to the summer 1620.

Downlink common channels 1615 are multiplied by a channel gain proper for the downlink common channels by a multiplier 1630, and then provided to the summer 1620. The downlink common channels 1615 include a primary common control physical channel (P-CCPCH) for transmitting a broadcasting channel (BCH), and a secondary common control channel (S-CCCH) for transmitting a forward access channel (FACH) and a paging channel (PCH), and also include a common pilot channel. Other user's dedicated channel 1617, a dedicated channel used by other users in the Node B, is multiplied by a channel gain proper for the dedicated channels by a multiplier 1631 after being subject to coding, interleaving and spreading, and then provided to the summer 1620.

The summer 1620 sums up the downlink common channel, the downlink dedicated channels and the downlink shared channel, and provides its output to a multiplier 1621. The multiplier 1621 multiplies the output of the summer 1620 by the scrambling code used by the Node B, and provides its output to a modulator 1622. The modulator 1622 modulates the scrambled downlink signals and provides its output to an RF module 1623. The RF module 1623 up-converts the modulated downlink signals with a carrier, and transmits its output to the UEs in the Node B through an antenna 1625.

The present invention will be described with reference to a method for determining a power offset value of the TFCI for the DSCH based on the number of cells transmitting the TFCI for the DSCH and the number of cells not transmitting the TFCI for the DSCH, and a method for transmitting a power offset value determined by an SRNC (Serving RNC) to the Node B. The "SRNC" refers to an RNC, which manages a service of a UE and also manages connection with a core network (CN). The connection between the UE and the CN in the handover zone is performed through only one RNC, i.e., SRNC, and the other RNCs, i.e., DRNCs, are connected with the CN through the SRNC. An RNC not corresponding to the SRNC among the RNCs processing data from the UE is called a "drift RNC (DRNC)". Further, in the following description, the term "cell" refers to an area where a beam from one antenna is formed. Therefore, each Node B may form one cell or a plurality of cells.

Figure 17:
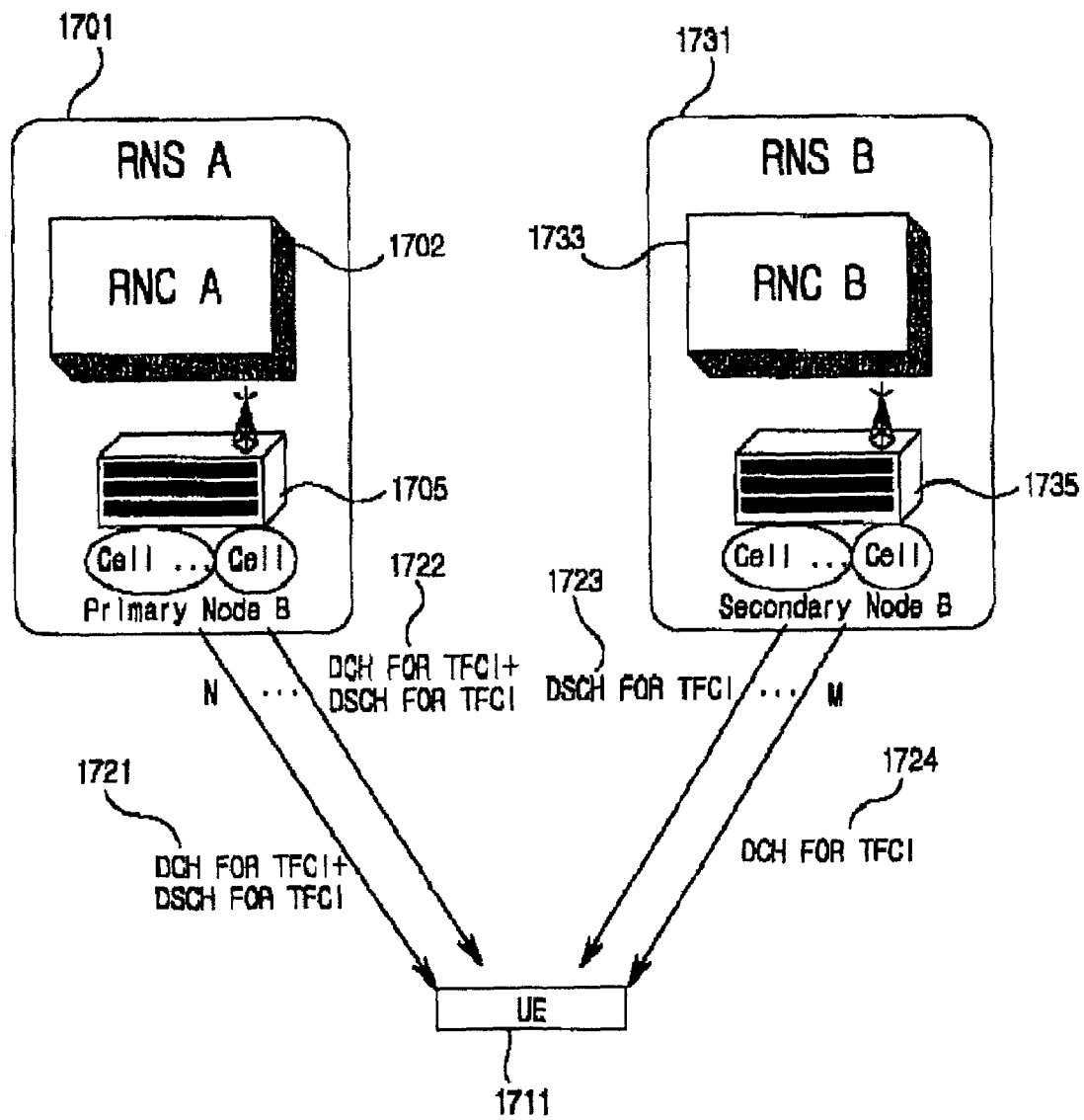
FIG. 17 illustrates a data flow between an RNC and a cell during a soft handover according to an embodiment of the present invention.

FIG. 17 illustrates a data flow between an RNC and a cell during a soft handover according to an embodiment of the present invention. For convenience sake, it will be assumed that a primary Node B 1705 and a secondary Node B 1735 belonging to different RNCs are set in an active set of the UE. Further, the number of cells connected to the primary Node B 1705 is N, while the number of cells connected to the secondary Node B 1735 is M. In addition, it will also be assumed that the TFCI is transmitted in the hard split mode. Herein, the "primary Node B" indicates the primary Node B 1705, which transmits DSCH and associated DL-DCH to a UE 1711, and the "secondary Node B" indicates the secondary Node B 1735, which transmits only DL-DCH to the UE 1711 due to movement of the UE 1711. When a certain RNC transmits the same information, the number of cells connectable to the UE can be set to a maximum of 8, which means that the M and N values are integers between 0 and 7. In this case, a power offset of the TFCI for the DSCH can be determined based on the M and N values. For example, the power offset can be determined using an M/N value. Illustrated in Table 8 are transmission power offsets of the TFCI for the DSCH, which are available for every case of the M/N value. When the DSCH TFCI has a length of 3 bits, there are 8 available transmission power offsets as illustrated in Table 8. An increase in length of the TFCI will lead to an increase in number of the available power offsets. In addition, the match between the power offset values and the M/N values can be varied.

TABLE 8

| M/N | Power Offset (dB) |
|---|---|
| 0 | 0 |
| 1/7 | 1 |
| 1/6 | |
| 1/5 | |
| 1/4 | 2 |
| 1/3 | |
| 2/5 | |
| 1/2 | 3 |
| 3/5 | |
| 2/3 | |
| 3/4 | 4 |
| 1 | |
| 4/3 | |
| 3/2 | 5 |
| 5/3 | |
| 2 | |
| 5/2 | 6 |
| 3 | |
| 4 | |
| 5 | 7 |
| 6 | |
| 7 | |

In Table 8, the M value is defined as the number of cells not transmitting the TFCI for the DSCH, while the N value is defined as the number of cells transmitting the TFCI for the DSCH. In addition, the number of the cells transmitting the TFCI for the DSCH can be equal to the number of cells in the active set existing in the RNC 1702 including the cell transmitting the DSCH, while the number of cells not transmitting the TFCI for the DSCH can be equal to the number of cells not existing in the RNC 1702 including a cell transmitting the DSCH. The M and N values can be recognized by the SRNC and the UE. Thus, the power offset is determined by the SRNC or the UE.

A method for transmitting the power offset value for the TFCI from the SRNC to the Node B will be described in detail with reference to the accompanying drawings. The power offset value determined based on the M and N values must be transmitted to the Node B. For example, the SRNC transmits the power offset value along with the DSCH. That is, it is considered that the SRNC can transmit the power offset value using a frame protocol that will be described below.

As another method for transmitting the power offset value without using the frame protocol, the SRNC can transmit the power offset value using an NBAP (Node B Application Part) message, a signaling message between the Node B and the SRNC. Among the signaling messages, a message capable of transmitting the power offset includes a Radio Link Reconfiguration message and a Radio Link Setup message.

FIG. 25 illustrates a structure of the Radio Link Setup message. In FIG. 25, PO1 indicates a power offset value for the TFCI. The PO1 value can be used when the same power offset value is applied to the TFCI for the DSCH and the TFCI for the DCH. When difference power offsets are applied to the TFCI for the DSCH and the TFCI for the DCH, a power offset value of the TFCI for the DSCH should be newly defined.

FIG. 26 illustrates a structure of the Radio Link Setup message for the case where the power offset value of the TFCI for the DSCH is set to be different from the power offset value of the TFCI for the DCH. In FIG. 26, PO4 indicates a power offset value of the TFCI for the DSCH.

The number of cells transmitting the TFCI for the DSCH can be varied each time the active set is changed due to a handover operation of the UE. In this case, the N value and the M value may also be changed, and the power offset value for the TFCI can be newly set based on the changed N and M values. The newly set power offset value can be transmitted using the Radio Link Reconfiguration message. The Radio Link Reconfiguration message can be transmitted only to the Node B, which is to receive the power offset changed, based on the N and M values. The changed power offset can be transmitted to every Node B including a cell for transmitting the TFCI for the DSCH, or only specific Node B including a specific cell for transmitting the DSCH.

FIG. 27 illustrates a structure of a Radio Link Reconfiguration message to which a power offset value is added. In FIG. 27, PO1 indicates a power offset value of the TFCI for the DCH, and PO4 indicates a power offset value of the TFCI for the DSCH. The structure of FIG. 27 is given on the assumption that the power offset value of the TFCI for the DSCH is different from the power offset value of the TFCI for the DCH. When the power offset value of the TFCI for the DSCH is identical to the power offset value of the TFCI for the DCH, the PO1 value should be added in FIG. 27. The power control method using the NBAP message can be performed in a similar manner to the power control method using the frame protocol.

Figure 18:
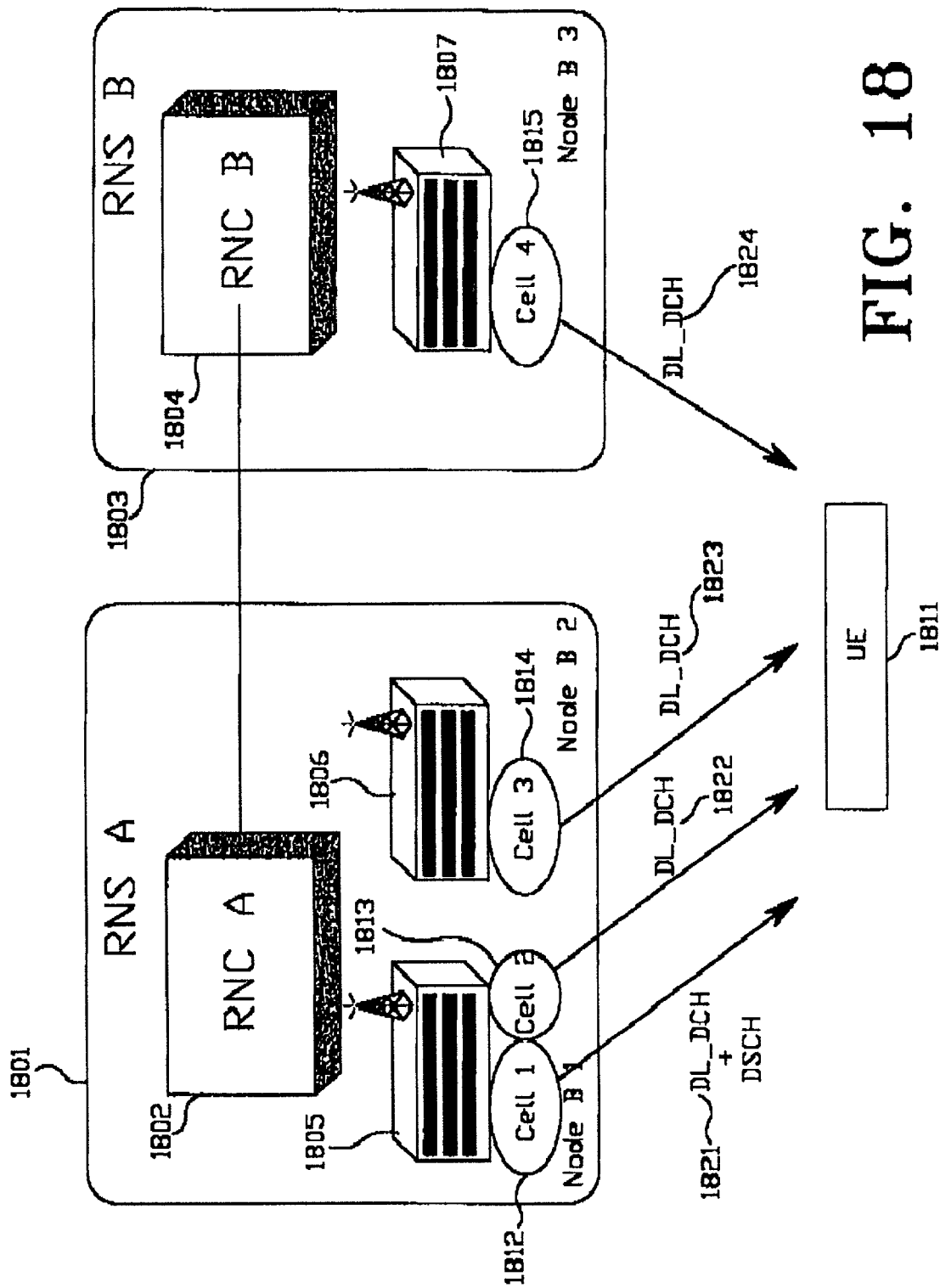
FIG. 18 illustrates a data flow between RNCs during a soft handover according to an embodiment of the present invention.
Figure 23:
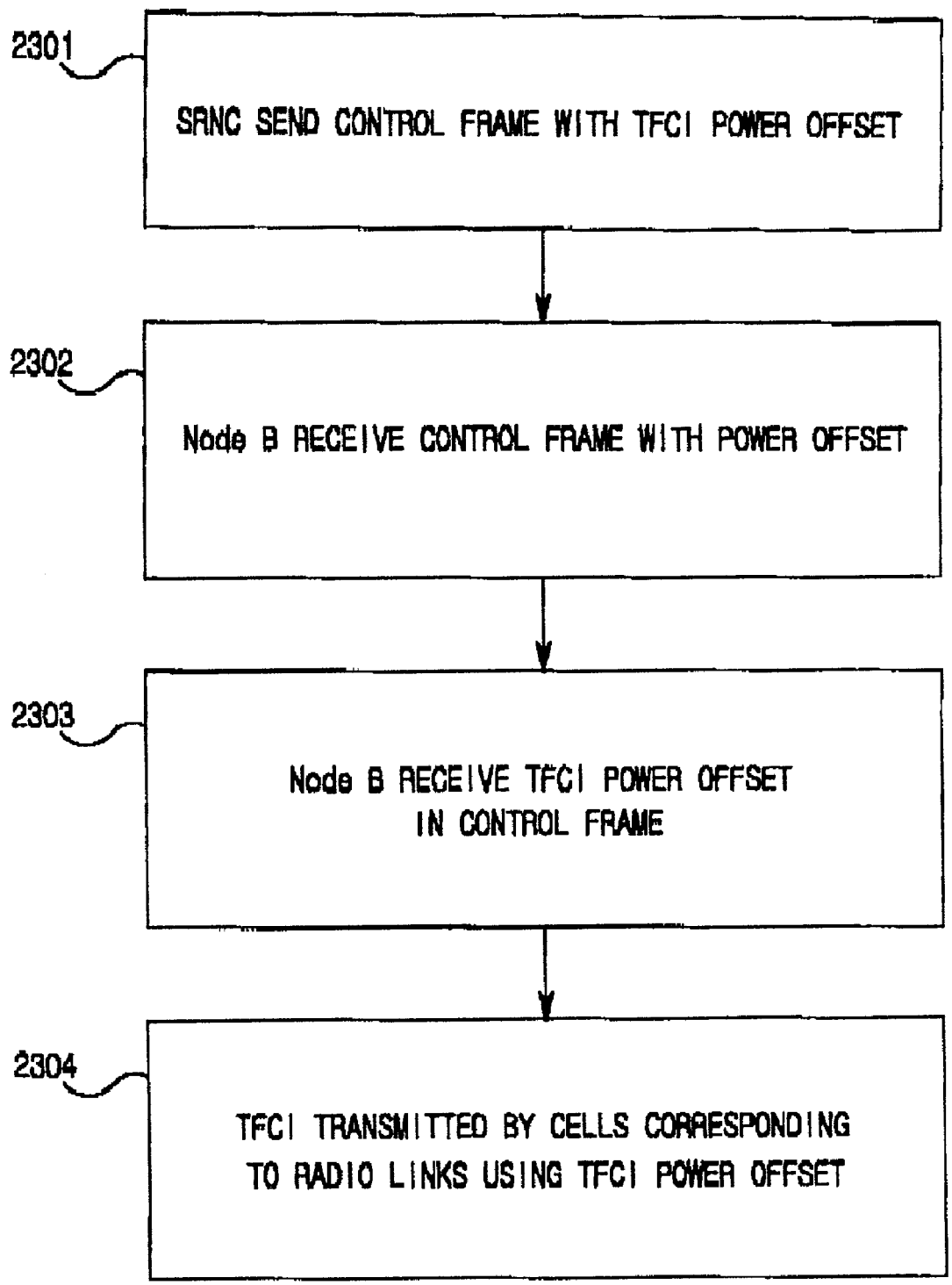
FIG. 23 illustrates a process for transmitting TFCI information according to an embodiment of the present invention.
Figure 24:
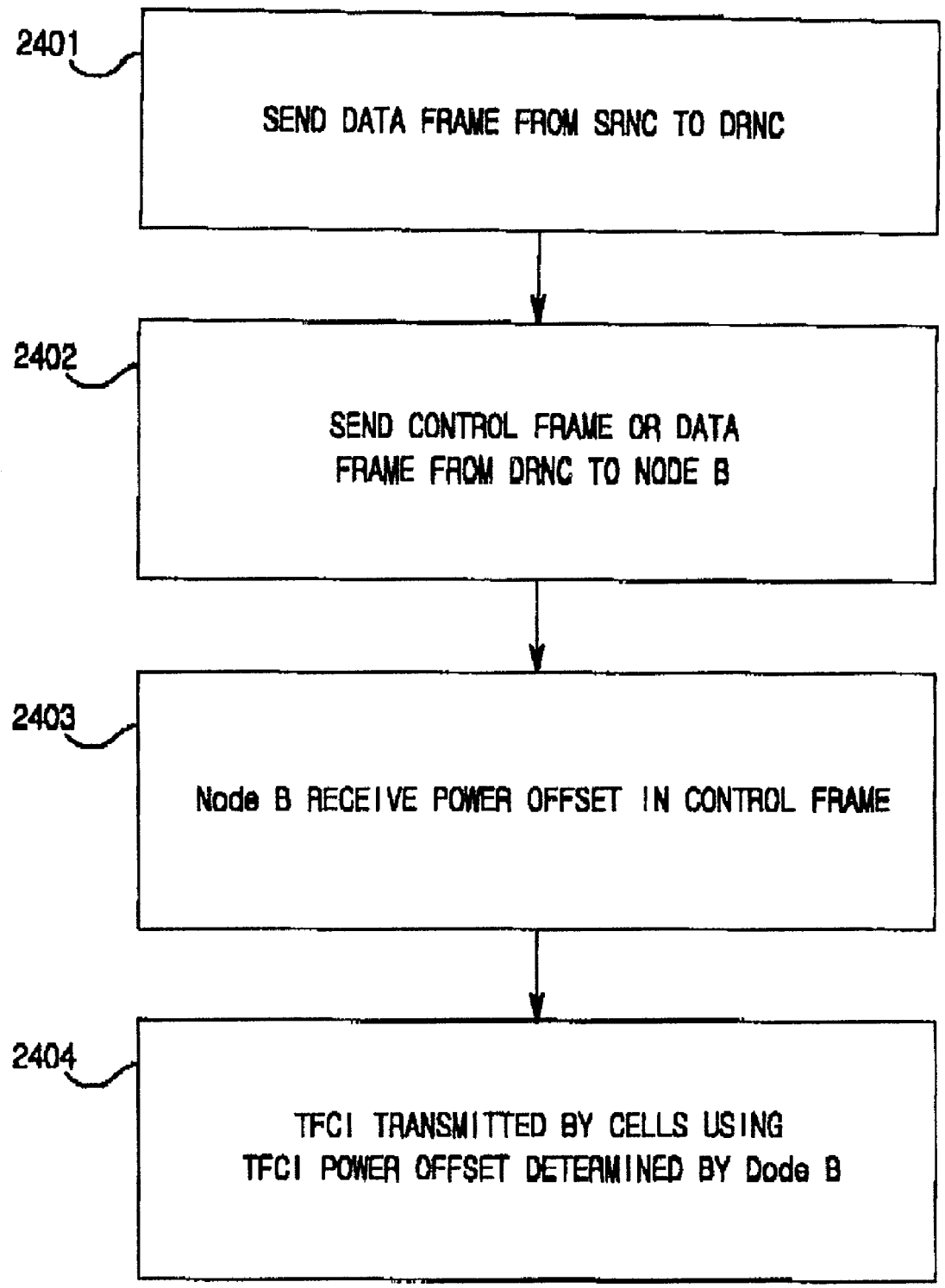
FIG. 24 illustrates a process for receiving a power offset at a Node B from SRNC through DRNC.

FIG. 18 illustrates a data flow between RNCs during a soft handover according to an embodiment of the present invention. For better understanding of the invention, FIG. 18 shows data frame transmission paths of the UE and power offset transmission paths from the RNC to the Node B. That is, it is assumed that there are an RNC A 1802 and an RNC B 1804 belonging to different RNSs, and they are connected to different Node Bs. Only a cell 1812 transmits DL-DCH plus DSCH information 1821 among downlink information transmitted from the Node B to the UE 1811, and the remaining cells 1812, 1813, 1814 and 1815 transmit only the DL-DCHs 1822, 1823 and 1824. There are two possible methods for transmitting the power offset from the RNC to the Node B using the control frame protocol. The two methods are shown in FIGS. 23 and 24. The RNC in the left hand side of FIG. 18 is SRNC in FIG. 23 and DRNC in FIG. 24.

Figure 21:
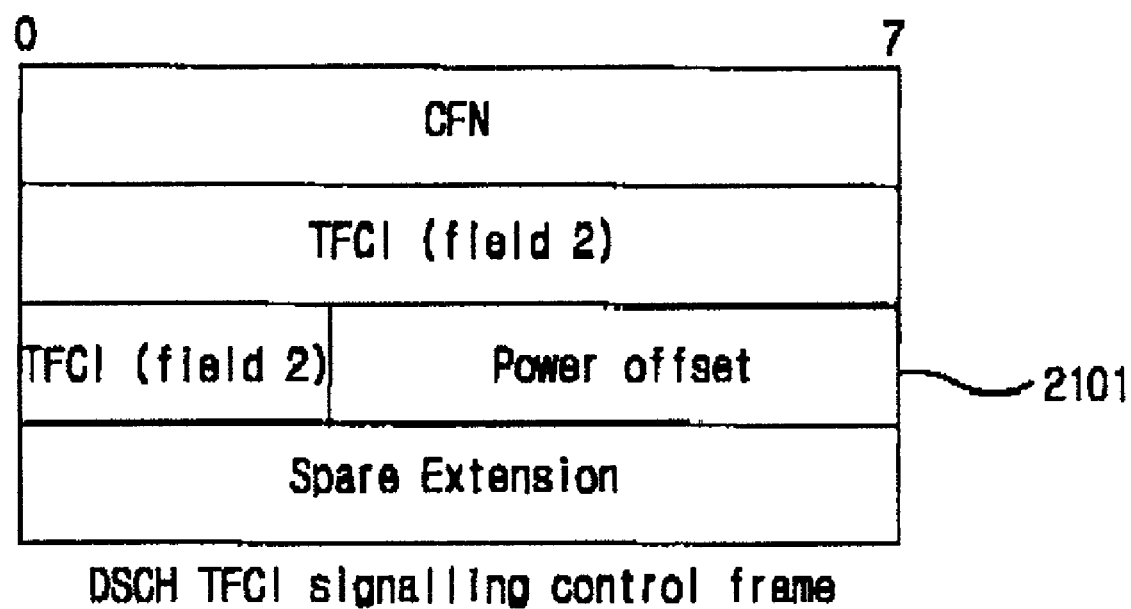
FIG. 21 illustrates a structure of a message for transmitting the power offset of the TFCI for the DSCH from the RNC to the Node B.

FIG. 23 illustrates a process for transmitting TFCI information according to an embodiment of the present invention. FIG. 23 shows the first method for transmitting the power offset to the Node B 1805 including a cell transmitting the TFCI for the DSCH is transmitted. In this method, the RNC 1802 connected to the Node B including a cell transmitting the TFCI for the DSCH is an SRNC. FIG. 21 illustrates a structure of a message for transmitting the power offset of the TFCI for the DSCH from the RNC to the Node B. As illustrated in FIG. 21, the RNC can add the power offset to a spare field 2101 of a DSCH TFCI signaling control frame message before transmitting the message to the Node B.

Referring to FIG. 23, in step 2301, the SRNC transmits a control frame including TFCI power offset information. The control frame has the structure of FIG. 21. In the embodiment of the present invention, the RNC 1802 transmits the control frame to every Node B including the cell transmitting the TFCI for the DSCH. That is, the RNC 1802 transmits the control frame to every Node B of an RNC connected to the cell transmitting the TFCI for the DSCH, i.e., to the Node B 1805 and the Node B 1806, so that all of the cells 1811, 1812 and 1813 in the soft handover zone can receive the power offset. As another method for transmitting the TFCI power offset information to the Node B, the RNC 1802 transmits the DSCH data frame only to the cell 1811 transmitting the DSCH data.

Figure 22:
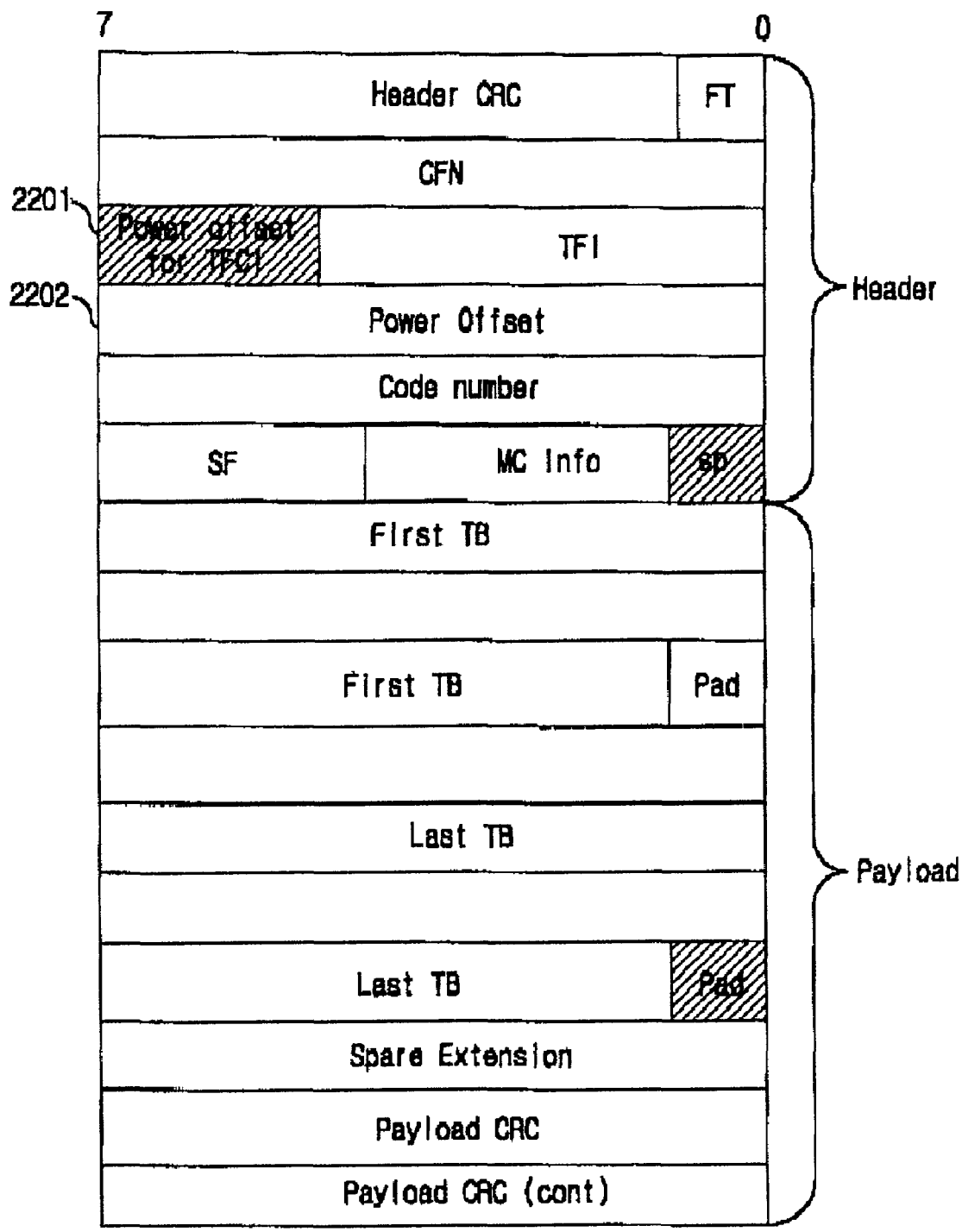
FIG. 22 illustrates a structure of the DSCH data frame used when the RNC transmits the power offset to the Node B.

FIG. 22 illustrates a structure of the DSCH data frame used when the RNC transmits the power offset to the Node B. FIG. 22 illustrates a method for adding the power offset to the DSCH data frame. More specifically, the power offset is filled in a spare field of the header. Thus, the RNC can transmit the power offset information to the Node B by filling the power offset information in the data frame. However, an adjacent power offset 2202 is not a TFCI power offset, but a data power offset. In FIG. 22, the power offset is added to spare bits lined up with TFI bits. Since the number of the spare bits is 3, the number of cases capable of transmitting the power offset from the RNC to the Node B is 8.

As another method for transmitting the power offset from the RNC to the Node B, there is provided a method for transmitting the power offset using both the control frame and the data frame.

Turning back to FIG. 23, in step 2302, the Node B receives the control frame including the power offset, transmitted by the SRNC in the step 2301. When a data frame is received instead of the control frame, only the Node B 1805 including the cell 1811 transmitting the TFCI for the DSCH receives the data frame.

In step 2303, the cells in the Node B receive the TFCI power offset information in the control frame. Similarly, when the data frame is received instead of the control frame in the step 2302, only the cell 1811 transmitting the TFCI for the DSCH receives the power offset.

Finally, in step 2304, the cells corresponding to respective radio links transmit the TFCI using the TFCI power offset of the Node B.

Figure 19:
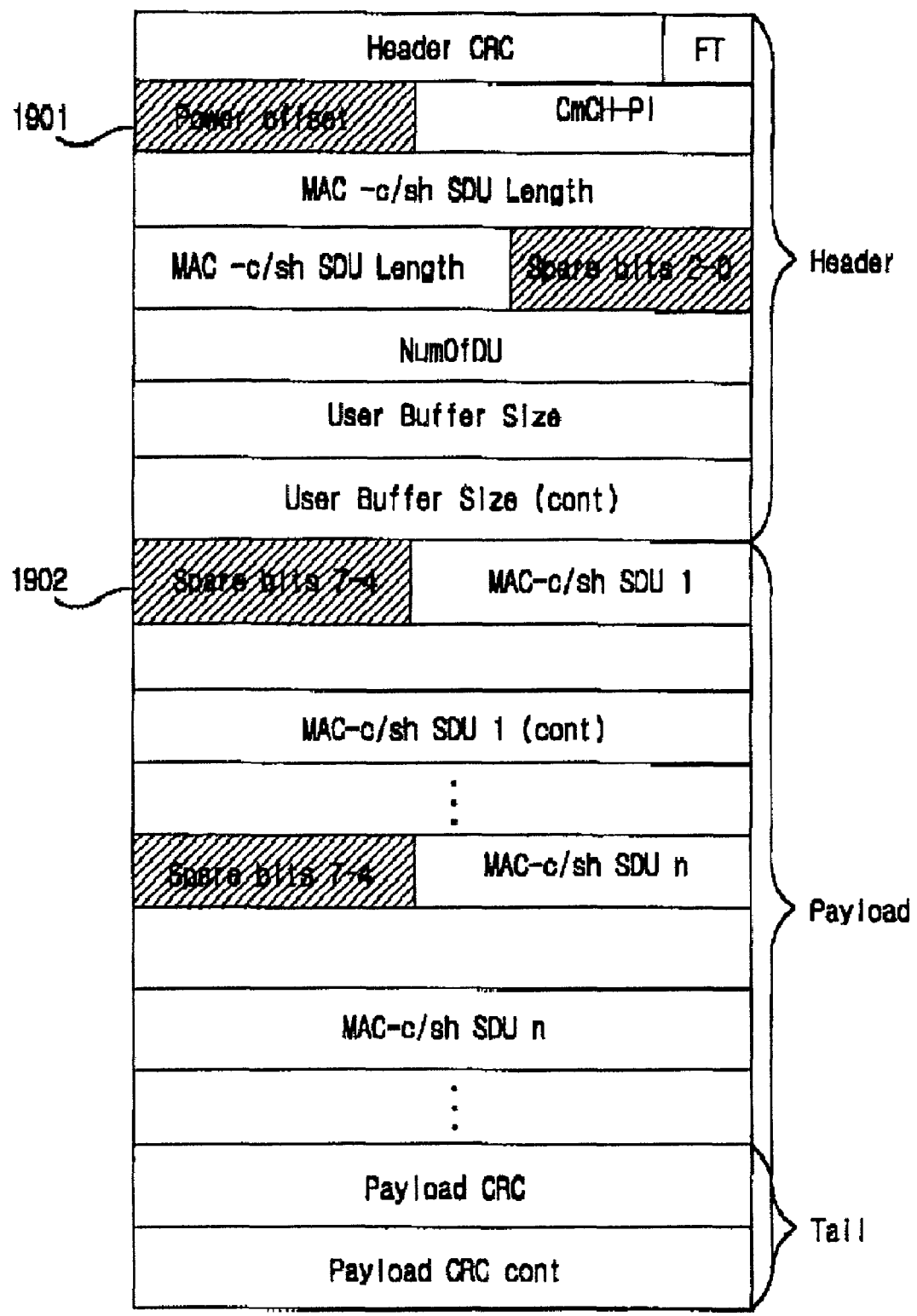
FIG. 19 illustrates a structure of the DSCH data frame to which the power offset is added.
Figure 20:
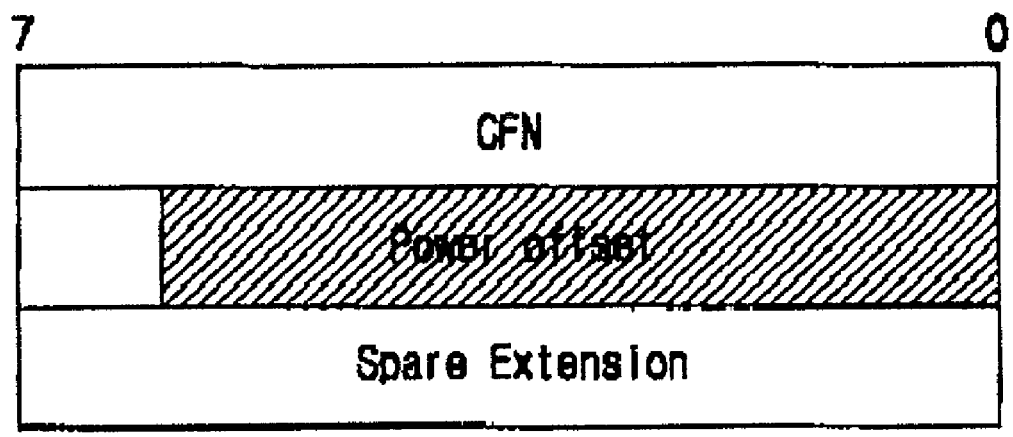
FIG. 20 illustrates a structure of the control frame used when the SRNC transmits the power offset to the DRNC.

FIG. 24 illustrates a process for receiving a power offset at a Node B from SRNC through DRNC. In this method, the RNC 1802 connected to the Node B including a cell transmitting the TFCI for the DSCH is a DRNC. The SRNC transmits the power offset to the DRNC using the control frame. FIG. 20 illustrates a structure of the control frame used when the SRNC transmits the power offset to the DRNC. The control frame refers to a radio frame used when the SRNC transmits control information to the DRNC. In FIG. 20, the power offset is inserted a reserved field, the length of which is variable. That is, the reserved field may have a length of 8 bits, or a length of less than 8 bits as shown in FIG. 20. As another method for transmitting the power offset from the SRNC to the DRNC, the SRNC transmits the power offset information to the DRNC by adding it to the DSCH data frame. FIG. 19 illustrates a structure of the DSCH data frame to which the power offset is added. As illustrated, the power offset value can be transmitted in line with CmCH-PI (Common Transport Channel Priority Indicator, 4 bits) of the DSCH data frame. Referring to FIG. 19, a header added when the Node B receives the DSCH data frame has a 4-bit spare field 1901 for transmitting data, like a spare field 1902 in the data part. The power offset of the TFCI for the DSCH is filled in this field.

Referring to FIG. 24, in step 2401, the SRNC 1804 transmits a control frame or a data frame to the DRNC 1802. In step 2402, the DRNC 1802 transmits the control frame or the data frame to the Node Bs 1805 and 1806. In step 2403, each Node B receives the TFCI power offset in the control frame or the data frame. Finally, in step 2404, the UE receives the TFCI power offset selected by Node B.

There are three possible methods for transmitting the power offset from the RNC to the Node B. In the first method, the RNC 1802 transmits DSCH data frame only to the cell 1811 transmitting the TFCI for the DSCH. In the second method, the RNC 1802 transmits the control frame to all of the Node Bs 1805 and 1806 of the RNC connected to the cell transmitting the TFCI for the DSCH, such that all of the cells 1811, 1812 and 1813 existing in the soft handover zone receive the power offset. The third method is a combined method of the first method and the second method.

A description will be made of a method for differently applying, in the Node B, the power offset using the signaling message received from the UE.

As an example of the method using the signaling message received from the UE, the Node B can use an SSDT code. The respective cells transmitting the TFCI for the DSCH are assigned unique temporary IDs, and the UE in the soft handover zone periodically transmits primary cell information to the Node Bs in the active set through an uplink FBI field. A cell, a signal received from which has the highest level, is selected as the primary cell. The Node B transmitting the TFCI for the DSCH can differently apply the power offset to the primary cell and the non-primary cell. There are three methods for applying the power offset.

In the first method for applying the power offset, for the primary cell, the Node B transmits the intact power offset value received from the SRNC, and for the non-primary cell, the Node B transmits a value determined by adding a specific power offset to the power offset. For example, if the specific power offset value is 3 dB and the power offset value received from the SRNC is 5 dB, the primary cell transmits the TFCI at a power offset of 5 dB and the non-primary cell transmits the TFCI at a power offset of 8 dB. As stated above, the power offset of the TFCI can be applied to both the TFCI for the DCH and the TFCI for the DSCH, or only the TFCI for the DSCH. Alternatively, the non-primary cell uses the power offset value received from the SRNC, while the primary cell uses a power offset lower by the specific power offset than the original power offset.

Finally, only the primary cell can maintain the power offset. In short, it is possible to increase the non-primary cell power offset to, for example, 2 dB, and increase the primary cell power offset to be slightly higher than the original value. Further, it is possible to maintain the original primary cell power offset.

As described above, the UE receiving the DSCH can correctly receive the TFCI for the DSCH in the soft handover zone, and the Node B transmitting the DSCH can reliably transmit the TFCI for the DSCH in the soft handover zone. In addition, in transmitting the TFCI for the DSCH, the RNC transmitting the DSCH determines a relative power offset of the TFCI for the DSCH considering the number of the Node Bs except for the primary Node B transmitting the DSCH, and controls transmission power of the TFCI for the DSCH based on the determined power offset.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A UE apparatus for determining transmission power of a second TFCI (Transmit Format Combination Indictor) bit indicating transport format information of data on a downlink shared channel transmitted from a selected Node B to a UE (User Equipment) in a mobile communication system including the UE existing in a handover zone and a plurality of Node Bs in an active set indicating Node Bs capable of communicating with the UE, wherein the Node Bs transmit dedicated channel data including a first TFCI bit to the UE over dedicated channels, wherein the selected Node B among the Node Bs transmits dedicated channel data including the first TFCI bit and the second TFCI bit over a dedicated channel and transmits downlink shared channel data over the downlink shared channel, wherein a dedicated channel frame from the selected Node B has a plurality of time slots, each of the time slots including a transmission data field and a TFCI field indicating transport format information of the transmission data, each of the TFCI fields including a first field where the first TFCI bit indicating transport format information of the dedicated channel data transmitted over the dedicated channels is located and a second field where the second TFCI bit indicating transport format information of the downlink shared channel data transmitted over the dedicated shared channel is located, the apparatus comprising:

a plurality of common channel pilot estimators for estimating levels of common channel pilot signals received from the Node Bs in the active set; and a downlink transmission power control command generator for determining a transmission power offset of the second TFCI bit using the measured levels of the common channel pilot signals, provided from the common channel pilot estimators.

2. The apparatus as claimed in claim 1, wherein the downlink transmission power control command generator transmits the power offset over an FBI field.

3. The apparatus as claimed in claim 2, wherein the power offset is transmitted over the FBI field using an SSDT signal.

4. The apparatus as claimed in claim 2, wherein the FBI field is comprised of an S field and a D field.

5. The apparatus as claimed in claim 1, further comprising a transmitter for transmitting the FBI field.

6. A method for determining transmission power of a second TFCI (Transmit Format Combination Indictor) bit indicating transport format information of data on a downlink shared channel transmitted from a selected Node B to a UE (User Equipment) in a mobile communication system including the UE existing in a handover region and a plurality of Node Bs in an active set indicating Node Bs capable of communicating with the UE, comprising the steps of:

the Node Bs transmitting dedicated channel data including a first TFCI bit to the UE over dedicated channels, wherein a first Node B among the Node Bs transmits dedicated channel data including the first TFCI bit and the second TFCI bit over a dedicated channel and transmitting downlink shared channel data over the downlink shared channel; and the first Node B determining a transmission power level of the second TFCI bit to be higher than a ratio of transmission power of the dedicated channel data from a Node B transmitting only the dedicated channel data to transmission power of the first TFCI bit;

wherein a dedicated channel frame from the first Node B has a plurality of time slots, each of the time slots including a transmission data field and a TFCI field indicating transport format information of the transmission data, each of the TFCI fields including a first field where the first TFCI bit indicating transport format information of the dedicated channel data transmitted over the dedicated channels is located and a second field where the second TFCI bit indicating transport format information of the downlink shared channel data transmitted over the dedicated shared channel is located.

7. A method for determining transmission power of a second TFCI (Transmit Format Combination Indictor) bit indicating transport format information of data on a downlink shared channel transmitted from a selected Node B to a UE (User Equipment) in a mobile communication system including the UE existing in a handover zone and a plurality of Node Bs in an active set indicating Node Bs capable of communicating with the UE, comprising the steps of:
the Node Bs transmitting dedicated channel data including a first TFCI bit to the UE over dedicated channels;
a first Node B among the Node Bs transmitting dedicated channel data including the first TFCI bit and the second TFCI bit over a dedicated channel and transmitting downlink shared channel data over the downlink shared channel; and
the UE determining a power offset of the second TFCI bit by comparing a sum of dedicated channel signals received from the Node Bs with reception power of the downlink shared channel and then transmitting the power offset to the first Node B;
wherein a dedicated channel frame from the first Node B has a plurality of time slots, each of the time slots including a transmission data field and a TFCI field indicating transport format information of the transmission data, each of the TFCI fields including a first field where the first TFCI bit indicating transport format information of the dedicated channel data transmitted over the dedicated channels is located and a second field where the second TFCI bit indicating transport format information of the downlink shared channel data transmitted over the dedicated shared channel is located.

8. A method for determining transmission power of a second TFCI (Transmit Format Combination Indictor) bit indicating transport format information of data on a downlink shared channel transmitted from a selected Node B to a UE (User Equipment) in a mobile communication system including the UE existing in a handover zone and a plurality of Node Bs in an active set indicating Node Bs capable of communicating with the UE, comprising the steps of:
the Node Bs transmitting dedicated channel data including a first TFCI bit to the UE over dedicated channels;
a first Node B among the Node Bs transmitting dedicated channel data including the first TFCI bit and the second TFCI bit over a dedicated channel and transmitting downlink shared channel data over the downlink shared channel; and
a controller of the first Node B determining a power offset larger in level than transmission power of the first TFCI bit according to a number of active sets of the UE and transmitting the determined power offset to the first Node B;
wherein a dedicated channel frame from the first Node B has a plurality of time slots, each of the time slots including a transmission data field and a TFCI field indicating transport format information of the transmission data, each of the TFCI fields including a first field where the first TFCI bit indicating transport format information of the dedicated channel data transmitted over the dedicated channels is located and a second field where the second TFCI bit indicating transport format information of the downlink shared channel data transmitted over the dedicated shared channel is located.

9. An apparatus for determining transmission power of a second TFCI (Transmit Format Combination Indictor) bit indicating transport format information of data on a downlink shared channel in a mobile communication system including a UE(User Equipment) existing in a handover region for a plurality of Node Bs, the apparatus comprising:
the Node Bs transmitting dedicated channel data including a first TFCI bit indicating transport format information of the dedicated channel data transmitted to the UE over dedicated channels, wherein at least a selected Node B among the Node Bs transmitting dedicated channel data including the first TFCI bit and the second TFCI bit over a dedicated channel and transmitting downlink shared channel data over the downlink shared channel; and
the selected Node B determining a transmission power level of the second TFCI bit of the selected Node B to be higher than a ratio of transmission power of the first TFCI bit from Node Bs transmitting only the dedicated channel data.

10. An apparatus for determining transmission power of a second TFCI (Transmit Format Combination Indictor) bit indicating transport format information of data on a downlink shared channel in a mobile communication system including a UE(User Equipment) existing in a handover region for a plurality of Node Bs, the apparatus comprising:
the Node Bs transmitting dedicated channel data including a first TFCI bit to the UE over dedicated channels, wherein at least a selected Node B among the Node Bs transmitting dedicated channel data including the first TFCI bit and the second TFCI bit over a dedicated channel and transmitting down link shared channel data over the downlink shared channel; and
the UE determining a power offset for the transmission power of the second TFCI bit of the selected Node B to be higher than a ratio of transmission power of the first TFCI bit from Node Bs transmitting only the dedicated channel data and transmitting the power offset to the selected Node B.

11. A method for data transmission, comprising the steps of:
transmitting over a first channel at least a first TFCI (Transmit Format Combination Indictor) bit for indicating transport format information of a second channel by a plurality of cells; and
transmitting over a third channel at least a second TFCI bit for indicating transport format information of a fourth channel by a primary cell selected among the plurality of cells;
wherein a transmission power of the first TFCI bit is set using a first offset, and a transmission power of the second TFCI bit is set using a second offset.

12. The method of claim 11, wherein the first channel is a DPCCH (Dedicated Physical Control Channel) transmitted by the plurality of cells.

13. The method of claim 11, wherein the second channel is a DPDCH (Dedicated Physical Data Channel).

14. The method of claim 11, wherein the third channel is a DPCCH (Dedicated Physical Control Channel) transmitted by the primary cell.

15. The method of claim 11, wherein the fourth channel is a DSCH (Downlink Shared Channel) transmitted by the primary cell.

16. The method of claim 11, wherein the second offset is lager than the first offset.

17. A method for data transmission, comprising the steps of:
transmitting over a DPDCH (Dedicated Physical Data Channel) and a DPCCH(Dedicated Physical Control Channel) at least a first TFCI (Transmit Format Combination Indictor) bit for indicating transport format information of the DPDCH by a plurality of cells; and
transmitting over the DPDCH, a DSCH (Downlink Shared Channel) and a DPCCH including a first TFCI bit for indicating transport format information of the DPDCH and a second TFCI bit for indicating transport format information of the DSCH by a primary cell selected among the plurality of cells;
wherein a transmission power of the first TFCI bit is set using a first offset, and a transmission power of the second TFCI bit is set using a second offset.

18. The method of claim 17, wherein the second offset is lager than the first offset.

19. A method for data transmission in a communication system, comprising the steps of:
transmitting over a first channel at least data for a UE (User Equipment) by at least one cell among a plurality of cells;
transmitting over a second channel at least the data for the UE by the at least one cell among the plurality of cells; and
transmitting over a third channel at least one of a first TFCI (Transmit Format Combination Indictor) bit for indicating transport format information of the first channel and a second TFCI bit for indicating transport format information of the second channel by the at least one cell among the plurality of cells;
wherein a transmission power of the first TFCI bit is set using a first offset, and a transmission power of the second TFCI bit is set using a second offset.

20. The method of claim 19, wherein the first channel is a DPDCH (Dedicated Physical Data Channel).

21. The method of claim 19, wherein the second channel is a DSCH (Downlink Shared Channel).

22. The method of claim 19, wherein the third channel is a DPCCH (Dedicated Physical Control Channel).

23. The method of claim 19, wherein the at least one cell among the plurality of cells is a primary cell selected by the UE.

24. The method of claim 19, wherein the second offset is lager than the first offset.

25. A method for data transmission, comprising the steps of:
selecting a cell among a plurality of cells as a primary cell by a UE (User Equipment);
transmitting information of the primary cell to the plurality of cells;
receiving over a first channel at least data for the UE from the primary cell;
receiving over a second channel at least the data for the UE from the primary cell; and
receiving over a third channel including at least one of a first TFCI (Transmit Format Combination Indictor) bit for indicating transport format information of the first channel and a second TFCI bit for indicating transport format information of the second channel from the primary cell;
wherein a transmission power of the first TFCI bit is set using a first offset, and a transmission power of the second TFCI bit is set using a second offset.

26. The method of claim 25, wherein the first channel is a DPDCH (Dedicated Physical Data Channel).

27. The method of claim 25, wherein the second channel is a DSCH (Downlink Shared Channel).

28. The method of claim 25, wherein the third channel is a DPCCH (Dedicated Physical Control Channel).

29. The method of claim 25, wherein the primary cell is selected among the plurality of cells in an active set for the UE.

30. The method of claim 25, wherein the second offset is lager than the first offset.

31. A system for data transmission, comprising the steps of:
a plurality of cells for transmitting over a first channel at least a first TFCI (Transmit Format Combination Indictor) bit for indicating transport format information of a second channel;
a primary cell selected among the plurality of cells for transmitting a third channel including at least a second TFCI bit for indicating transport format information of a fourth channel; and
a UE (User Equipment) for receiving the first channel, the second channel, the third channel, and the fourth channel, and for selecting the primary cell among the plurality of cells;
wherein a transmission power of the first TFCI bit is set using a first offset, and a transmission power of the second TFCI bit is set using a second offset.

32. The system of claim 31, wherein the first channel is a DPCCH (Dedicated Physical Control Channel) transmitted by the plurality of cells.

33. The system of claim 31, wherein the second channel is a DPDCH (Dedicated Physical Data Channel).

34. The system of claim 31, wherein the third channel is a DPCCH (Dedicated Physical Control Channel) transmitted by the primary cell.

35. The system of claim 31, wherein the fourth channel is a DSCH (Downlink Shared Channel) transmitted by the primary cell.

36. The system of claim 31, wherein the second offset is larger than the first offset.

37. A system for data transmission, comprising the steps of:
a plurality of cells for transmitting over a DPDCH (Dedicated Physical Data Channel) and a DPCCH (Dedicated Physical Control Channel);
a primary cell for transmitting over the DPDCH, a DSCH (Downlink Shared Channel), and a DPCCH a first TFCI bit for indicating transport format information of the DPDCH and a second TFCI bit for indicating transport format information of the DSCH; and
a UE (User Equipment) for receiving over the first channel, the second channel, the third channel, and the fourth channel, selecting the primary cell among the plurality of cells, and transmitting information of the primary cell to the plurality of cells;
wherein a transmission power of the first TFCI bit is set using a first offset, and a transmission power of the second TFCI bit is set using a second offset.

38. The system of claim 37, wherein the second offset is larger than the first offset.

* * * * *